US012617466B2

(12) United States Patent
Saigo et al.

(10) Patent No.: US 12,617,466 B2
(45) Date of Patent: May 5, 2026

(54) VEHICLE DRIVING ASSIST DEVICE, VEHICLE, VEHICLE DRIVING ASSIST METHOD, AND STORAGE MEDIUM

(71) Applicant: TOYOTA JIDOSHA KABUSHIKI KAISHA, Toyota (JP)

(72) Inventors: Shintaro Saigo, Nisshin (JP); Kentaro Hamada, Toyota (JP); Keigo Miyama, Toyota (JP); Takeshi Hamaguchi, Seto (JP); Shusaku Sugamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/609,605

(22) Filed: Mar. 19, 2024

(65) Prior Publication Data

US 2024/0359740 A1     Oct. 31, 2024

(30) Foreign Application Priority Data

Apr. 27, 2023     (JP) ................................. 2023-073265

(51) Int. Cl.
| | |
|---|---|
| *B62D 15/02* | (2006.01) |
| *B60W 10/20* | (2006.01) |
| *B60W 30/10* | (2006.01) |
| *B60W 30/12* | (2020.01) |

(52) U.S. Cl.
CPC ........... *B62D 15/025* (2013.01); *B60W 10/20* (2013.01); *B60W 30/10* (2013.01); *B60W 30/12* (2013.01)

(58) Field of Classification Search
CPC ...... B60W 30/10; B60W 10/20; B60W 30/12; B62D 15/025
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,321,461 B1 * | 4/2016 | Silver .................. | G06V 20/588 |
| 9,669,827 B1 * | 6/2017 | Ferguson .......... | B60W 60/0027 |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |

(Continued)

FOREIGN PATENT DOCUMENTS

| | | |
|---|---|---|
| JP | 07-315240 A | 12/1995 |
| JP | 2012-035709 A | 2/2012 |
| JP | 2022-188735 A | 12/2022 |

*Primary Examiner* — Lindsay M Low
*Assistant Examiner* — Brian R Kirby
(74) *Attorney, Agent, or Firm* — Sughrue Mion, PLLC

(57) ABSTRACT

A vehicle driving assist device includes a processor that controls a steering reaction force to be applied to a steering operation performed by a driver of a vehicle. The processor acquires a size of an intersection when the driver intends the vehicle to turn right or left at the intersection. The processor sets a steering angle of the vehicle necessary for the vehicle to turn right or left at the intersection as a guide steering angle based on the size of the intersection. The processor controls the steering reaction force based on a difference between the guide steering angle and an actual steering angle.

12 Claims, 13 Drawing Sheets

(56)             References Cited

U.S. PATENT DOCUMENTS

| | | | |
|---|---|---|---|
| 10,611,240 | B2 | 4/2020 | Masui et al. |
| 2010/0082203 | A1* | 4/2010 | Isaji ..................... B62D 15/025 |
| | | | 701/41 |
| 2010/0168998 | A1* | 7/2010 | Matsunaga ........... B60W 30/10 |
| | | | 701/532 |
| 2013/0096778 | A1* | 4/2013 | Goto ...................... B62D 5/008 |
| | | | 701/41 |
| 2013/0131925 | A1* | 5/2013 | Isaji ............... B60W 30/18145 |
| | | | 701/41 |
| 2014/0229068 | A1* | 8/2014 | Ueyama ................ B60W 10/20 |
| | | | 701/41 |
| 2015/0046038 | A1* | 2/2015 | Kawamata ......... G08G 1/09623 |
| | | | 701/41 |
| 2015/0134204 | A1* | 5/2015 | Kunihiro ................ B60R 21/00 |
| | | | 701/41 |
| 2018/0237066 | A1* | 8/2018 | Kawashima .......... B60W 30/04 |
| 2019/0071071 | A1* | 3/2019 | Yamada ............ B60W 50/0097 |
| 2019/0225219 | A1* | 7/2019 | Ueda ..................... B60W 10/20 |
| 2020/0164872 | A1* | 5/2020 | Yanagihara .......... B62D 15/025 |
| 2020/0278684 | A1 | 9/2020 | Naserian et al. |
| 2020/0282997 | A1* | 9/2020 | Ueda ............... B60W 30/18163 |
| 2022/0396310 | A1 | 12/2022 | Hamaguchi et al. |

* cited by examiner

START ⁓500

ACQUIRE TARGET STEERING ANGLE ⁓505

ACQUIRE CURVE RADIUS AND TARGET-VEHICLE SPEED ⁓510

ACQUIRE PREVIEW PERIOD AND GAIN ⁓515

ACQUIRE GUIDE STEERING ANGLE ⁓520

ACQUIRE GUIDE STEERING ANGLE DIFFERENCE ⁓525

ACQUIRE TARGET STEERING REACTION FORCE ⁓530

APPLY STEERING REACTION FORCE ⁓535

RETURN ⁓595

FIG. 8A

| Wtotal | Lcrrng | | |
|---|---|---|---|
| | Lcrrng < L1 | L1 ≤ Lcrrng ≤ L2 | L2 < Lcrrng |
| Wtotal < W1 | pleft_1 | pleft_1 | pleft_2 |
| W1 ≤ Wtotal ≤ W2 | pleft_1 | pleft_2 | pleft_3 |
| W2 < Wtotal | pleft_2 | pleft_3 | pleft_3 |

FIG. 8B

| Wtotal | Lcrrng | | |
|---|---|---|---|
| | Lcrrng < L1 | L1 ≤ Lcrrng ≤ L2 | L2 < Lcrrng |
| Wtotal < W1 | pright_1 | pright_1 | pright_2 |
| W1 ≤ Wtotal ≤ W2 | pright_1 | pright_2 | pright_3 |
| W2 < Wtotal | pright_2 | pright_3 | pright_3 |

VEHICLE DRIVING ASSIST DEVICE, VEHICLE, VEHICLE DRIVING ASSIST METHOD, AND STORAGE MEDIUM

CROSS-REFERENCE TO RELATED APPLICATION

This application claims priority to Japanese Patent Application No. 2023-073265 filed on Apr. 27, 2023, incorporated herein by reference in its entirety.

BACKGROUND

1. Technical Field

The present disclosure relates to a vehicle driving assist device, a vehicle, a vehicle driving assist method, and a storage medium.

2. Description of Related Art

There is known a vehicle driving assist device configured to assist a driver's operation on a steering wheel (steering operation) when the driver drives a vehicle along a curved road. The device acquires the curvature radius of the curved road and, when the curvature radius is small, that is, when the curved road is a sharply curved road, adjusts a steering reaction force to be applied to the steering wheel so that the driver can easily turn the steering wheel (see, for example, Japanese Unexamined Patent Application Publication No. 2022-188735 (JP 2022-188735 A)).

When the vehicle travels along a curved road, that is, when there is only one road where the vehicle can travel, the vehicle driving assist device described above can control the steering reaction force based on the curvature radius of that road. When there are two or more roads where the vehicle can travel as in a case where the vehicle is at an intersection, that is, there are two or more roads where the vehicle can travel by turning right or left, however, the device cannot determine the curvature radius of a traveling road where the vehicle is to travel. As a result, the device cannot apply, to the steering wheel operation (steering operation), the steering reaction force that allows the driver to smoothly perform the steering wheel operation to turn the vehicle right or left.

SUMMARY

The present disclosure provides a vehicle driving assist device that can apply, to a steering operation, a steering reaction force that allows a driver to smoothly perform the steering operation even in a situation where the driver turns the vehicle to the right or left at an intersection.

A vehicle driving assist device according to one aspect of the present disclosure includes a processor configured to control a steering reaction force to be applied to a steering operation performed by a driver of a vehicle. The processor is configured to acquire a size of an intersection when the driver intends the vehicle to turn right or left at the intersection, set a steering angle of the vehicle necessary for the vehicle to turn right or left at the intersection as a guide steering angle based on the size of the intersection, and control the steering reaction force based on a difference between the guide steering angle and an actual steering angle.

With the vehicle driving assist device, the guide steering angle can be set by using the size of the intersection even in the situation where the driver turns the vehicle to the right or left at the intersection. Therefore, a steering reaction force that allows the driver to smoothly perform the steering operation can be applied to the steering operation.

The processor may be configured to, when the driver intends the vehicle to turn left at the intersection of a first kind including two or more possible left-turn roads that the vehicle is allowed to enter by turning left and which of the possible left-turn roads the driver intends the vehicle to enter by turning left is unknown, acquire the size of the intersection based on a possible left-turn road farthest from the vehicle out of the possible left-turn roads. In this case, the processor may be configured to, when the driver intends the vehicle to turn right at the intersection of a second kind including two or more possible right-turn roads that the vehicle is allowed to enter by turning right and which of the possible right-turn roads the driver intends the vehicle to enter by turning right is unknown, acquire the size of the intersection based on a possible right-turn road farthest from the vehicle out of the possible right-turn roads.

With the vehicle driving assist device, the steering reaction force that allows the driver to smoothly perform the steering operation can be applied to the steering operation even in the situation where the driver turns the vehicle to the right or left at the intersection including a plurality of possible left-turn roads or a plurality of possible right-turn roads.

The processor may be configured to, when the driver starts to turn the vehicle to left at the intersection of the first kind, control on the steering reaction force is started based on the difference between the guide steering angle and the actual steering angle, and then a first possible left-turn road that the driver intends the vehicle to enter by turning left is identified, control the steering reaction force based on a difference between the actual steering angle and the guide steering angle that is set under an assumption that the vehicle is to enter the first possible left-turn road. In this case, the processor may be configured to, when the driver starts to turn the vehicle to right at the intersection of the second kind, control on the steering reaction force is started based on the difference between the guide steering angle and the actual steering angle, and then a first possible right-turn road that the driver intends the vehicle to enter by turning right is identified, control the steering reaction force based on a difference between the actual steering angle and the guide steering angle that is set under an assumption that the vehicle is to enter the first possible right-turn road.

With the vehicle driving assist device, after the possible left-turn road or the possible right-turn road that the driver intends the vehicle to enter by turning left or right is identified, the steering reaction force is controlled based on the possible left-turn road or the possible right-turn road. Therefore, a steering reaction force in accordance with the driver's intention can be applied to the steering operation.

The processor may be configured to acquire a longitudinal size and a lateral size of the intersection with respect to the vehicle, and acquire the size of the intersection based on the longitudinal size and the lateral size.

With the vehicle driving assist device, the size of the intersection is acquired based on the longitudinal size and the lateral size of the intersection with respect to the vehicle. Therefore, the size of the intersection can be acquired more accurately.

A vehicle according to another aspect of the present disclosure includes the vehicle driving assist device, a steering wheel, and a reaction force actuator. The reaction force actuator is configured to apply the steering reaction force controlled by the processor to the steering operation when a force of the steering operation performed by the driver is applied to the steering wheel.

A vehicle driving assist method according to still another aspect of the present disclosure is a method for controlling a steering reaction force to be applied to a steering operation performed by a driver of a vehicle. The method includes acquiring a size of an intersection when the driver intends the vehicle to turn right or left at the intersection, setting a steering angle of the vehicle necessary for the vehicle to turn right or left at the intersection as a guide steering angle based on the size of the intersection, and controlling the steering reaction force based on a difference between the guide steering angle and an actual steering angle.

With the vehicle driving assist method, the steering reaction force that allows the driver to smoothly perform the steering operation can be applied to the steering operation for the same reason as that described above.

A non-transitory storage medium according to yet another aspect of the present disclosure stores instructions. The instructions are executable by one or more processors and cause the one or more processors to perform functions for controlling a steering reaction force to be applied to a steering operation performed by a driver of a vehicle. The functions include acquiring a size of an intersection when the driver intends the vehicle to turn right or left at the intersection, setting a steering angle of the vehicle necessary for the vehicle to turn right or left at the intersection as a guide steering angle based on the size of the intersection, and controlling the steering reaction force based on a difference between the guide steering angle and an actual steering angle.

With the storage medium, the steering reaction force that allows the driver to smoothly perform the steering operation can be applied to the steering operation for the same reason as that described above.

The constituent elements according to the present disclosure are not limited to those according to an embodiment of the present disclosure to be described later with reference to the drawings. Other objects, other features, and accompanying advantages of the present disclosure will easily be understood from the description of the embodiment of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8A is a diagram showing a table to be used to acquire a traveling road curvature;

FIG. 8B is a diagram showing a table to be used to acquire the traveling road curvature;

FIG. 9 is a diagram showing a situation where a target vehicle has reached a position where a marking line such as a lane line of a near-side possible left-turn road can be detected from camera image information;

DETAILED DESCRIPTION OF EMBODIMENTS

Figure 1:
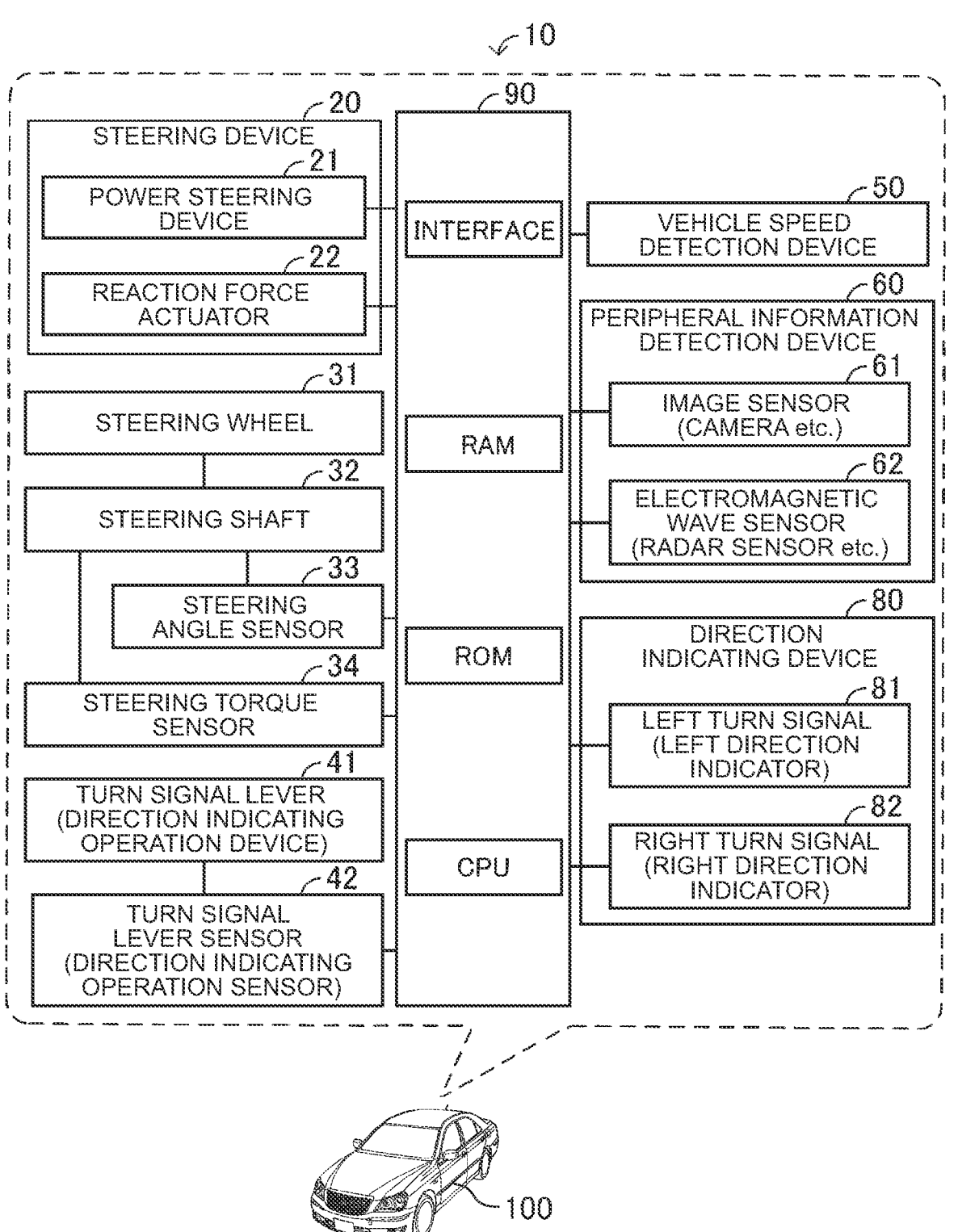
FIG. 1 is a diagram showing a vehicle driving assist device according to an embodiment.

A vehicle driving assist device, a vehicle driving assist method, and a vehicle driving assist program according to an embodiment of the present disclosure will be described below with reference to the drawings. FIG. 1 shows a vehicle driving assist device 10. The vehicle driving assist device 10 is mounted on a target vehicle 100. The vehicle driving assist device 10 will be described below taking an example in which an operator of the target vehicle 100 is a person who rides in the target vehicle 100 and drives the target vehicle 100 (i.e., a driver of the target vehicle 100).

The operator of the target vehicle 100 may be a person who remotely drives the target vehicle 100 without riding in the target vehicle 100 (i.e., a remote operator of the target vehicle 100). When the operator of the target vehicle 100 is a remote operator, the vehicle driving assist device 10 is mounted on each of the target vehicle 100 and remote control equipment installed outside the target vehicle 100 to remotely drive the target vehicle 100. The functions of the vehicle driving assist device 10 described below are shared between the vehicle driving assist device 10 mounted on the target vehicle 100 and the vehicle driving assist device 10 mounted on the remote control equipment.

The present disclosure can also be applied to a vehicle that travels by switching as appropriate between manual driving in which the operator performs a driving operation and automated driving or autonomous driving in which a control device such as an electronic control unit (ECU) automatically or autonomously performs a driving operation without the operator's driving operation. In this case, the present disclosure is applied to a case where the vehicle is traveling by manual driving.

The example described below is based on a region or country where the laws etc. stipulate that vehicles travel on a left side of a road. Therefore, the right and left in the following description will be reversed when the present disclosure is applied to a vehicle that travels in a region or country where the laws etc. stipulate that vehicles travel on a right side of a road.

As shown in FIG. 1, the vehicle driving assist device 10 includes an electronic control unit (ECU) 90 as a control device. The ECU 90 includes a microcomputer as a main component. The microcomputer includes a central processing unit (CPU), a storage medium such as a read only memory (ROM), a random access memory (RAM), or a non-volatile memory, and an interface. The CPU executes instructions, programs, or routines stored in the storage medium to implement various functions. In particular, the vehicle driving assist device 10 in this example stores programs that implement various types of control to be executed by the vehicle driving assist device 10 in the storage medium.

The vehicle driving assist device 10 may be configured to update the programs stored in the storage medium through wireless communication (e.g., Internet communication) with an external device.

The target vehicle 100 includes a steering device 20. The steering device 20 is a device for steering the target vehicle 100, and includes a power steering device 21 and a reaction force actuator 22 in this example.

The power steering device 21 outputs a steering torque (steering force) for steering the target vehicle 100.

The reaction force actuator 22 applies a reaction force (steering reaction force) to a steering wheel 31 when a force for rotating the steering wheel 31 is applied to the steering wheel 31. In other words, when the driver applies the force for rotating the steering wheel 31 to the steering wheel 31, the reaction force actuator 22 applies the reaction force (steering reaction force) to the rotating operation (steering wheel operation or steering operation).

The power steering device 21 and the reaction force actuator 22 are electrically connected to the ECU 90. The ECU 90 can control the steering torque to be output from the power steering device 21 by controlling operation of the power steering device 21, and can control the steering reaction force by controlling operation of the reaction force actuator 22.

The target vehicle 100 includes the steering wheel 31, a steering shaft 32, a steering angle sensor 33, a steering torque sensor 34, a turn signal lever 41 serving as a direction indicating operation device, a turn signal lever sensor 42 serving as a direction indicating operation sensor, a vehicle speed detection device 50, a peripheral information detection device 60, and a direction indicating device 80.

The steering angle sensor 33 detects a steering angle of the target vehicle 100. In this example, the steering angle sensor 33 detects a rotation angle of the steering shaft 32 with respect to a neutral position. The steering angle sensor 33 is electrically connected to the ECU 90. The steering angle sensor 33 transmits information on the detected rotation angle of the steering shaft 32 to the ECU 90. The ECU 90 acquires the rotation angle of the steering shaft 32 as an actual steering angle δ based on the information.

The steering torque sensor 34 detects a torque input to the steering shaft 32 by the driver via the steering wheel 31. The steering torque sensor 34 is electrically connected to the ECU 90. The steering torque sensor 34 transmits information on the detected torque to the ECU 90. The ECU 90 acquires the torque input to the steering shaft 32 by the driver via the steering wheel 31 (driver input torque) based on the information. The ECU 90 acquires a requested steering torque based on the actual steering angle δ, the driver input torque, and a traveling speed of the target vehicle 100 (target-vehicle speed V described later), and controls the operation of the steering device 20 to output the requested steering torque from the steering device 20.

The turn signal lever 41 is a device to be operated by the driver to actuate the direction indicating device 80. The direction indicating device 80 includes a left turn signal 81 serving as a left direction indicator and a right turn signal 82 serving as a right direction indicator.

The turn signal lever sensor 42 is a device that detects the driver's operation on the turn signal lever 41. The turn signal lever sensor 42 is electrically connected to the ECU 90. The ECU 90 actuates the left turn signal 81 when the turn signal lever sensor 42 detects an operation to actuate the left turn signal 81. The ECU 90 actuates the right turn signal 82 when the turn signal lever sensor 42 detects an operation to actuate the right turn signal 82.

When the turn signal lever sensor 42 detects an operation to stop the actuation of the direction indicating device 80, the ECU 90 stops the actuation of the left turn signal 81 or the right turn signal 82 that is being actuated at that time.

The vehicle speed detection device 50 detects a traveling speed of the target vehicle 100, and is typified by a wheel speed sensor. The vehicle speed detection device 50 is electrically connected to the ECU 90. The vehicle speed detection device 50 transmits information on the detected traveling speed of the target vehicle 100 to the ECU 90. The ECU 90 acquires the traveling speed of the target vehicle 100 as the target-vehicle speed V based on the information.

The peripheral information detection device 60 detects information on the periphery of the target vehicle 100, and includes an image sensor 61 and an electromagnetic wave sensor 62 in this example.

The image sensor 61 acquires an image of the periphery of the target vehicle 100, and is typified by a camera that captures an image of the periphery of the target vehicle 100. The image sensor 61 is electrically connected to the ECU 90. The image sensor 61 transmits information on the acquired image to the ECU 90. The ECU 90 acquires information on the periphery of the target vehicle 100 as peripheral detection information IS based on the information (camera image information IC).

The electromagnetic wave sensor 62 detects an object around the target vehicle 100, and is typified by a radar sensor (such as a millimeter wave radar), an acoustic wave sensor such as an ultrasonic sensor (clearance sonar), or an optical sensor such as a laser radar (light detection and ranging (LiDAR)). The electromagnetic wave sensor 62 is electrically connected to the ECU 90. The electromagnetic wave sensor 62 emits a radio wave, and receives the radio wave reflected by an object (reflected wave). The electromagnetic wave sensor 62 transmits information on the emitted radio wave and the received radio wave (reflected wave) to the ECU 90. In other words, the electromagnetic wave sensor 62 detects an object present around the target vehicle 100, and transmits information on the detected object to the ECU 90. The ECU 90 can acquire information on the object present around the target vehicle 100 as the peripheral detection information IS based on the information (object information IO). In this example, the object is a vehicle, a motorcycle, a bicycle, a person, etc.

Operation of Vehicle Driving Assist Device

Next, operation of the vehicle driving assist device 10 will be described. The vehicle driving assist device 10 executes steering reaction force control for controlling a steering reaction force to be applied to an operation on the steering wheel 31 (steering wheel operation or steering operation) by the driver of the target vehicle 100.

Particularly when the driver intends the target vehicle 100 to turn right or left at an intersection 300, the vehicle driving assist device 10 acquires the size of the intersection 300. The vehicle driving assist device 10 sets a steering angle of the target vehicle 100 necessary for the target vehicle 100 to turn right or left at the intersection 300 as a guide steering angle δguide based on the size of the intersection 300. The vehicle driving assist device 10 controls the steering reaction force based on a difference between the set guide steering angle δguide and the actual steering angle δ (guide steering angle difference Δδguide).

Figure 2:
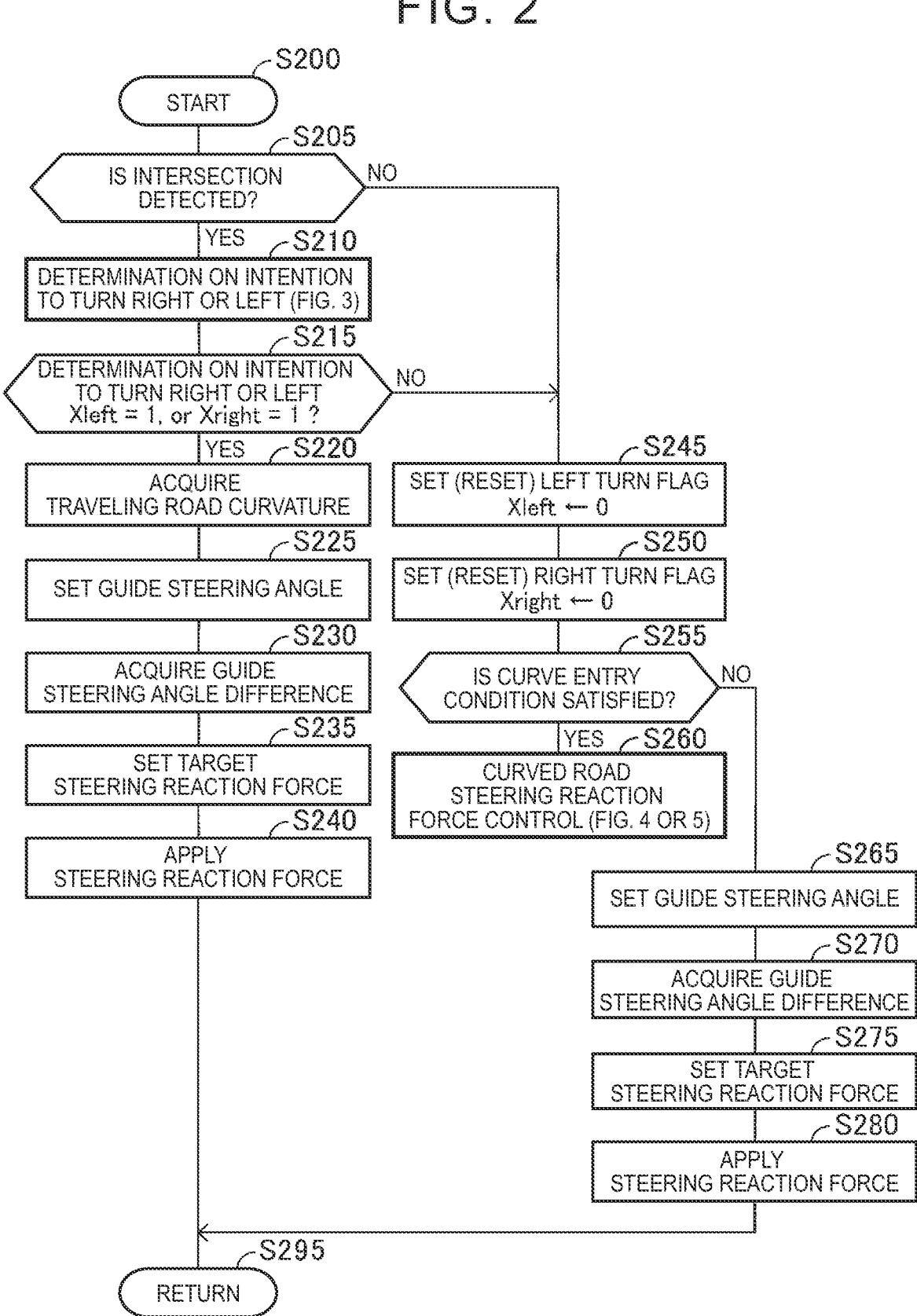
FIG. 2 is a flowchart showing a routine to be executed by the vehicle driving assist device according to the embodiment.

For this purpose, the vehicle driving assist device 10 executes the steering reaction force control by executing a routine shown in FIG. 2 at predetermined calculation intervals. At a predetermined timing, the vehicle driving assist device 10 starts a process from step S200 of the routine shown in FIG. 2, and advances the process to step S205 to determine whether an intersection 300 is detected.

In this example, the vehicle driving assist device 10 determines that an intersection 300 is detected when an intersection 300 present ahead of the target vehicle 100 on a target-vehicle traveling road RD is detected from the camera image information IC. As described above, the target-vehicle traveling road RD is a road where the target vehicle 100 is currently traveling.

Figure 3:
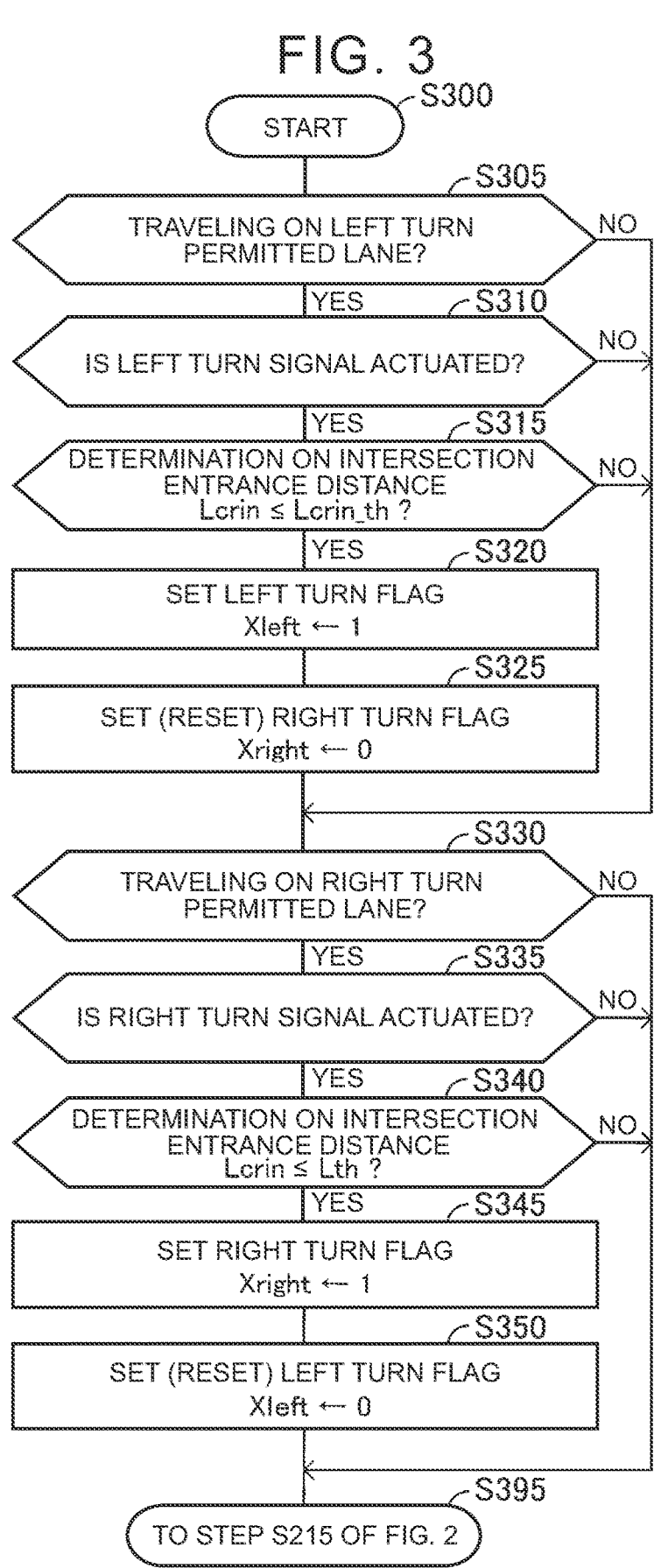
FIG. 3 is a flowchart showing a routine to be executed by the vehicle driving assist device according to the embodiment.

When the determination result is "Yes" in step S205, the vehicle driving assist device 10 advances the process to step S210, and executes a routine shown in FIG. 3. When the vehicle driving assist device 10 advances the process to step S210, the vehicle driving assist device 10 starts the process from step S300 of the routine shown in FIG. 3, and advances the process to step S305 to determine whether the target vehicle 100 is traveling on a left turn permitted lane. The left turn permitted lane is a lane where the target vehicle 100 is permitted to turn left at the detected intersection 300.

The vehicle driving assist device 10 determines whether the target vehicle 100 is traveling on the left turn permitted lane based on the camera image information IC. The vehicle driving assist device 10 may acquire the position of the target vehicle 100 based on a global positioning system (GPS) signal. In that case, the vehicle driving assist device 10 acquires information on the lane where the target vehicle 100 is traveling from map information in a map information database based on the acquired position of the target vehicle 100. The vehicle driving assist device 10 determines whether the target vehicle 100 is traveling on the left turn permitted lane based on the acquired information.

When the determination result is "Yes" in step S305, the vehicle driving assist device 10 advances the process to step S310, and determines whether the left turn signal 81 is actuated.

When the determination result is "Yes" in step S310, the vehicle driving assist device 10 advances the process to step S315, and determines whether an intersection entrance distance Lcrin is equal to or smaller than a predetermined distance (predetermined intersection entrance distance Lcrin_th).

Figure 6:
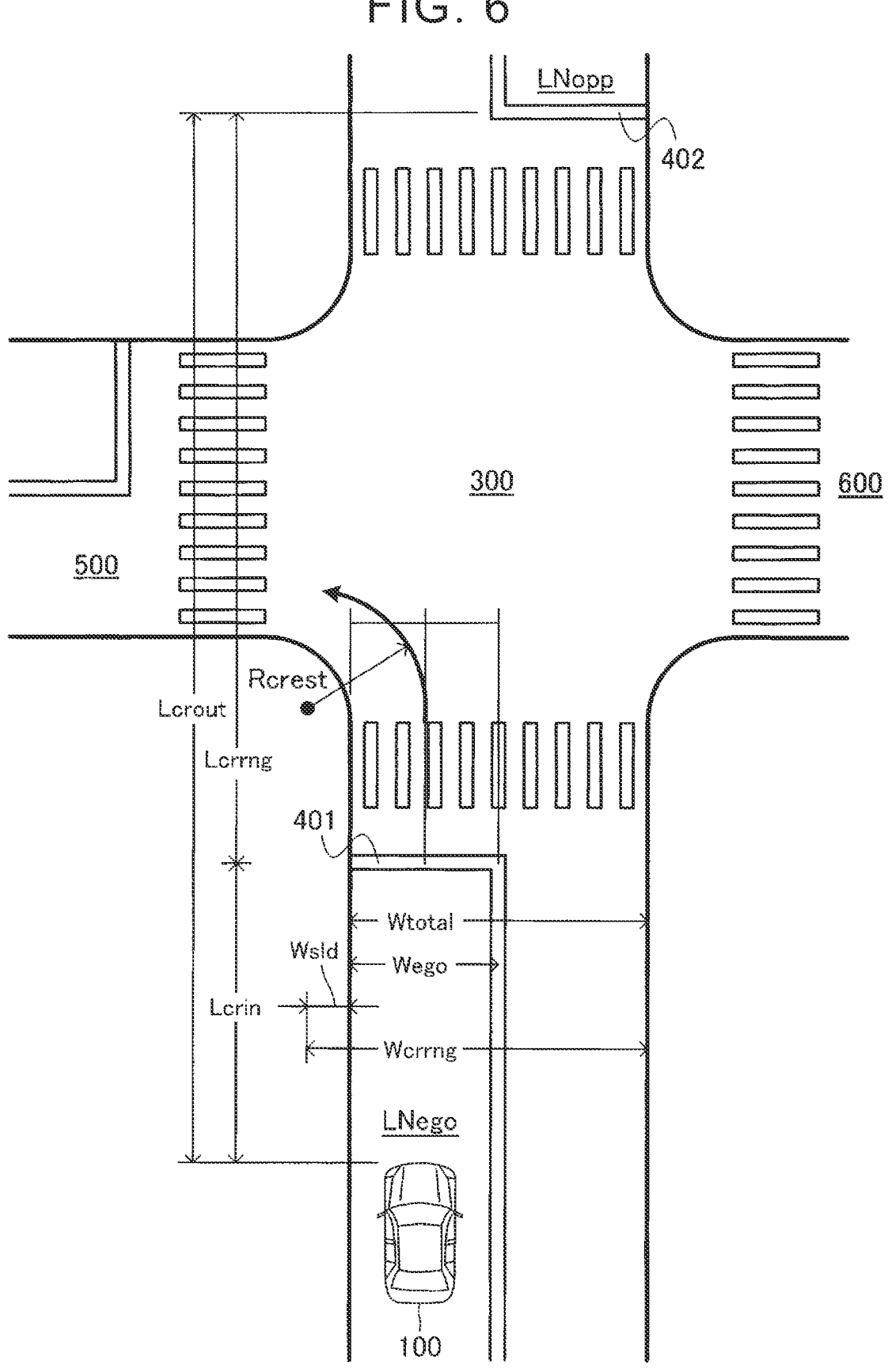
FIG. 6 is a diagram showing an intersection having only one possible left-turn road.

The intersection entrance distance Lcrin is a distance between the target vehicle 100 and the entrance of the intersection 300. In this example, the intersection entrance distance Lcrin is a distance between the target vehicle 100 and a target-vehicle stop line 401 as shown in FIG. 6. The target-vehicle stop line 401 is provided on a target-vehicle traveling lane LNego, and is provided at the entrance of the intersection 300 when viewed from the target vehicle 100. In other words, the target-vehicle stop line 401 is a stop line that the target vehicle 100 passes immediately before entering the intersection 300. The target-vehicle traveling lane LNego is a lane where the target vehicle 100 is currently traveling.

When the determination result is "Yes" in step S315, the vehicle driving assist device 10 advances the process to step S320, and sets the value of a left turn flag Xleft to "1".

Next, the vehicle driving assist device 10 advances the process to step S325 to set (reset) the value of a right turn flag Xright to "0", and advances the process to step S330.

When the determination result is "No" in step S305, S310, or S315, the vehicle driving assist device 10 advances the process directly to step S330.

When the vehicle driving assist device 10 advances the process to step S330, the vehicle driving assist device 10 determines whether the target vehicle 100 is traveling on a right turn permitted lane. The right turn permitted lane is a lane where the target vehicle 100 is permitted to turn right at the detected intersection 300.

The vehicle driving assist device 10 determines whether the target vehicle 100 is traveling on the right turn permitted lane based on the camera image information IC. The vehicle driving assist device 10 may acquire the position of the target vehicle 100 based on a GPS signal. In that case, the vehicle driving assist device 10 acquires information on the lane where the target vehicle 100 is traveling from the map information in the map information database based on the acquired position of the target vehicle 100. The vehicle driving assist device 10 determines whether the target vehicle 100 is traveling on the right turn permitted lane based on the acquired information.

When the determination result is "Yes" in step S330, the vehicle driving assist device 10 advances the process to step S335, and determines whether the right turn signal 82 is actuated.

When the determination result is "Yes" in step S335, the vehicle driving assist device 10 advances the process to step S340, and determines whether the intersection entrance distance Lcrin is equal to or smaller than the predetermined intersection entrance distance Lcrin_th.

When the determination result is "Yes" in step S340, the vehicle driving assist device 10 advances the process to step S345, and sets the value of the right turn flag Xright to "1".

Next, the vehicle driving assist device 10 advances the process to step S350 to set (reset) the value of the left turn flag Xleft to "0", and advances the process to step S215 of the routine shown in FIG. 2 via step S395.

When the determination result is "No" in step S330, S335, or S340, the vehicle driving assist device 10 advances the process directly to step S215 of the routine shown in FIG. 2 via step S395.

When the vehicle driving assist device 10 advances the process to step S215 of the routine shown in FIG. 2, the vehicle driving assist device 10 determines whether either the value of the left turn flag Xleft or the value of the right turn flag Xright is "1".

When the determination result is "Yes" in step S215, the vehicle driving assist device 10 advances the process to step S220, and acquires a traveling road curvature ρm.

The traveling road curvature ρm acquired in step S220 is a curvature of a traveling road that is presumed to be suitable for the target vehicle 100 to turn right or left at the intersection 300. Therefore, it can be said that the traveling road curvature ρm acquired in step S220 is a curvature of a virtual road when the target vehicle 100 turns right or left at the intersection 300.

When the value of the left turn flag Xleft is "1", the vehicle driving assist device 10 acquires, as the traveling road curvature ρm, a curvature of a traveling road suitable for the target vehicle 100 to turn left at the intersection 300. When the value of the right turn flag Xright is "1", the vehicle driving assist device 10 acquires, as the traveling road curvature ρm, a curvature of a traveling road suitable for the target vehicle 100 to turn right at the intersection 300.

Although there are various methods for acquiring the traveling road curvature ρm, one of the following two methods is adopted in this example.

In the first method, the vehicle driving assist device 10 first acquires the intersection entrance distance Lcrin and an intersection exit distance Lcrout from the camera image information IC. As described above, the intersection entrance distance Lcrin is a distance between the target vehicle 100 and the entrance of the intersection 300. The intersection exit distance Lcrout is a distance between the target vehicle 100 and the exit of the intersection 300.

For example, at the intersection 300 shown in FIG. 6, the intersection entrance distance Lcrin is a distance between the target vehicle 100 and the target-vehicle stop line 401, and the intersection exit distance Lcrout is a distance between the target vehicle 100 and an oncoming-vehicle stop line 402.

As described above, the target-vehicle stop line 401 is provided on the target-vehicle traveling lane LNego, and is provided at the entrance of the intersection 300 when viewed from the target vehicle 100. The oncoming-vehicle stop line 402 is provided on an oncoming lane LNopp for the target-vehicle traveling lane LNego, and is provided at the exit of the intersection 300 when viewed from the target vehicle 100.

The intersection 300 shown in FIG. 6 has only one possible left-turn road 500 that intersects the target-vehicle traveling road RD substantially perpendicularly, and has only one possible right-turn road 600 that intersects the target-vehicle traveling road RD substantially perpendicularly. The possible left-turn road 500 is a road that the target vehicle 100 can enter by turning left, and the possible right-turn road 600 is a road that the target vehicle 100 can enter by turning right.

Figure 7:
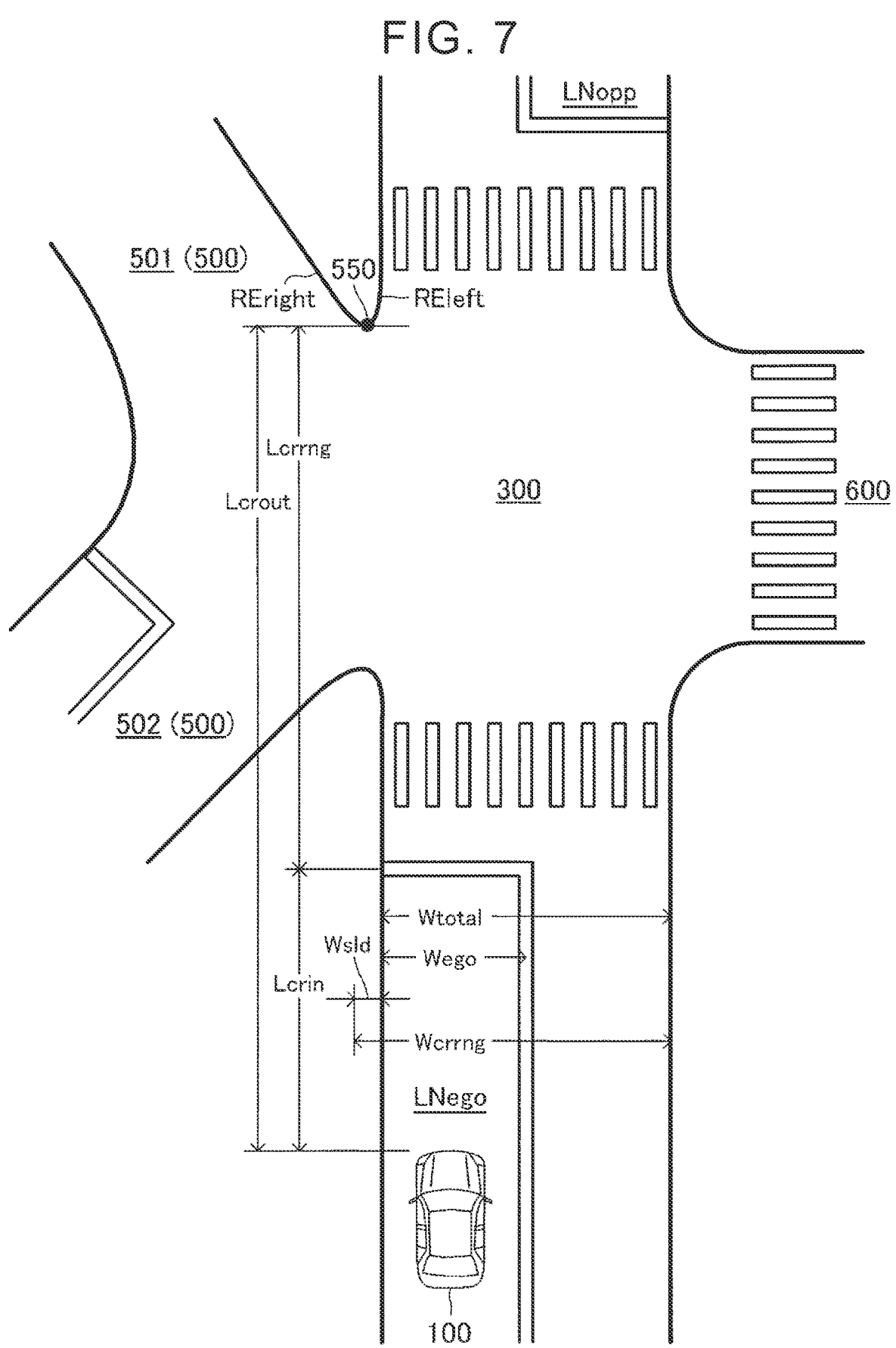
FIG. 7 is a diagram showing an intersection having a plurality of possible left-turn roads.

Also at an intersection 300 shown in FIG. 7, the intersection entrance distance Lcrin is a distance between the target vehicle 100 and the target-vehicle stop line 401. The intersection exit distance Lcrout is a distance between the target vehicle 100 and the oncoming-vehicle stop line 402 when the value of the right turn flag Xright is "1". The intersection exit distance Lcrout is a distance between the target vehicle 100 and a target-vehicle traveling road connection portion 550 when the value of the left turn flag Xleft is "1".

The target-vehicle traveling road connection portion 550 connects a right-side road boundary REright of a possible left-turn road 501 farthest from the target vehicle 100 and a left-side road boundary REleft of the target-vehicle traveling road RD beyond the intersection 300 when viewed from the target vehicle 100. The right-side road boundary REright is a right edge out of two edges of a road when viewed from the target vehicle 100, and the left-side road boundary REleft is a left edge out of two edges of a road when viewed from the target vehicle 100.

The intersection 300 shown in FIG. 7 has two possible left-turn roads 500 and only one possible right-turn road 600 that intersects the target-vehicle traveling road RD substantially perpendicularly.

When the driver intends the target vehicle 100 to turn left at an intersection 300 having two or more possible left-turn roads 500 that the target vehicle 100 can enter by turning left as shown in FIG. 7 and which of the possible left-turn roads 500 the driver intends the target vehicle 100 to enter by turning left is unknown, the vehicle driving assist device 10 acquires the size of the intersection 300 based on the possible left-turn road 501 farthest from the target vehicle 100 out of the possible left-turn roads 500 as described later. The vehicle driving assist device 10 controls the steering reaction force by using the acquired size of the intersection 300.

When the driver intends the target vehicle 100 to turn right at an intersection 300 having two or more possible right-turn roads 600 that the target vehicle 100 can enter by turning right and which of the possible right-turn roads 600 the driver intends the target vehicle 100 to enter by turning right is unknown, the vehicle driving assist device 10 similarly acquires the size of the intersection 300 based on a possible right-turn road farthest from the target vehicle 100 out of the possible right-turn roads 600 as described later. The vehicle driving assist device 10 controls the steering reaction force by using the acquired size of the intersection 300.

When the driver starts to turn the target vehicle 100 to the left at the intersection 300 having the two or more possible left-turn roads 500 as shown in FIG. 7, the control on the steering reaction force is started based on a difference (guide steering angle difference Δδguide) between the actual steering angle δ and the guide steering angle δguide (the steering angle of the target vehicle 100 necessary for turning the target vehicle 100 to the left at the intersection 300), and then a possible left-turn road 500 (502) that the driver intends the target vehicle 100 to enter by turning left is identified, the vehicle driving assist device 10 controls the steering reaction force based on a difference (guide steering angle difference Δδguide) between the actual steering angle δ and a guide steering angle δguide that is set under the assumption that the target vehicle 100 is to enter the identified possible left-turn road 500 (502).

When the driver starts to turn the target vehicle 100 to the right at the intersection 300 having the two or more possible right-turn roads 600, the control on the steering reaction force is started based on a difference (guide steering angle difference 4δguide) between the actual steering angle δ and the guide steering angle δguide (the steering angle of the target vehicle 100 necessary for turning the target vehicle 100 to the right at the intersection 300), and then a possible right-turn road 600 that the driver intends the target vehicle 100 to enter by turning right is identified, the vehicle driving assist device 10 similarly controls the steering reaction force based on a difference (guide steering angle difference 4δguide) between the actual steering angle δ and a guide steering angle δguide that is set under the assumption that the target vehicle 100 is to enter the identified possible right-turn road 600.

When a difference between the traveling road curvature ρm currently acquired in step S220 and a traveling road curvature ρm used to set a target steering reaction force RFtgt immediately before the traveling road curvature ρm is acquired in step S220 or a look point curvature ρw described later is larger than a predetermined value, a traveling road curvature ρm corrected so that the difference is equal to or smaller than the predetermined value may be used as the traveling road curvature ρm acquired in step S220. That is, the traveling road curvature ρm acquired in step S220 may be changed gradually.

Next, the vehicle driving assist device 10 acquires an intersection longitudinal width Lcrrng by using the intersection entrance distance Lcrin and the intersection exit distance Lcrout.

As shown in FIG. 6, the intersection longitudinal width Lcrrng is a length of the intersection 300 in a longitudinal direction with respect to the target vehicle 100, and represents a longitudinal size of the intersection 300 with respect to the target vehicle 100. In this example, the intersection longitudinal width Lcrrng is acquired by calculation according to Equation 1.

$$Lcrrng = Lcrout - Lcrin \tag{1}$$

If the intersection longitudinal width Lcrrng can be acquired directly from the camera image information IC, the intersection longitudinal width Lcrrng may be acquired directly from the camera image information IC.

The vehicle driving assist device 10 acquires an intersection lateral width Wcrrng.

As shown in FIG. 6, the intersection lateral width Wcrrng is a length of the intersection 300 in a lateral direction with respect to the target vehicle 100, and represents a lateral size of the intersection 300 with respect to the target vehicle 100. In this example, the vehicle driving assist device 10 acquires the intersection longitudinal width Loring as the intersection lateral width Wcrrng as shown in Equation 2.

$$Wcrrng=Lcrrng \tag{2}$$

Next, the vehicle driving assist device 10 acquires a road width Wtotal. As shown in FIG. 6, the road width Wtotal is a width of the target-vehicle traveling road RD in the lateral direction with respect to the target vehicle 100. In this example, the road width Wtotal is acquired based on the camera image information IC.

Next, the vehicle driving assist device 10 acquires a road shoulder width Wsld by using the road width Wtotal and the intersection lateral width Wcrrng. As shown in FIG. 6, the road shoulder width Wsld is a width of a road shoulder provided on the right or left side of the target-vehicle traveling road RD. In this example, the road shoulder width Wsld is acquired by calculation according to Equation 3.

$$Wsld = (Wcrrng - Wtotal)/2 \tag{3}$$

When the value acquired from Equation 3 is larger than zero, the vehicle driving assist device 10 acquires that value as the road shoulder width Wsld. When the value acquired from Equation 3 is equal to or smaller than zero, the vehicle driving assist device 10 sets the road shoulder width Wsld to zero.

Next, the vehicle driving assist device 10 acquires a target-vehicle lane width Wego based on the camera image information IC. The target-vehicle lane width Wego is a width of the target-vehicle traveling lane LNego in the lateral direction with respect to the target vehicle 100.

Next, the vehicle driving assist device 10 acquires a turning radius Rcrest by using the target-vehicle lane width Wego and the road shoulder width Wsld. The turning radius Rcrest is a radius of a traveling road suitable for the target vehicle 100 to turn right or left at the intersection 300. In this example, the turning radius Rcrest is acquired by calculation according to Equation 4 when the value of the left turn flag Xleft is "1". The turning radius Rcrest is acquired by calculation according to Equation 5 when the value of the right turn flag Xright is "1".

$$Rcrest = Wego/2 + Wsld \tag{4}$$

$$Rcrest = (Wtotal - Wego/2) + Wsld \tag{5}$$

In this example, the turning radius Rcrest acquired from Equation 4 is smaller than the turning radius Rcrest acquired from Equation 5 at the same intersection 300.

The vehicle driving assist device 10 acquires the reciprocal of the turning radius Rcrest as the traveling road curvature ρm as shown in Equation 6.

$$ρm=1/Rcrest \tag{6}$$

Alternatively, the vehicle driving assist device 10 acquires the traveling road curvature ρm as follows. That is, the vehicle driving assist device 10 first acquires the intersection longitudinal width Lcrrng and the road width Wtotal as described above.

When the value of the left turn flag Xleft is "1", the intersection longitudinal width Lcrrng is smaller than a first longitudinal width threshold L1th, and the road width Wtotal is smaller than a first road width threshold W1, the vehicle driving assist device 10 acquires a first left turn curvature ρleft_1 as the traveling road curvature ρm (see FIG. 8A).

When the value of the right turn flag Xright is "1", the intersection longitudinal width Lcrrng is smaller than the first longitudinal width threshold L1th, and the road width Wtotal is smaller than the first road width threshold W1, the vehicle driving assist device 10 acquires a first right turn curvature ρright_1 as the traveling road curvature ρm (see FIG. 8B).

When the value of the left turn flag Xleft is "1", the intersection longitudinal width Lcrrng is smaller than the first longitudinal width threshold L1th, and the road width Wtotal is equal to or larger than the first road width threshold W1 and equal to or smaller than a second road width threshold W2, the vehicle driving assist device 10 acquires the first left turn curvature ρleft_1 as the traveling road curvature ρm (see FIG. 8A). The second road width threshold W2 is set larger than the first road width threshold W1.

When the value of the right turn flag Xright is "1", the intersection longitudinal width Lcrrng is smaller than the first longitudinal width threshold L1th, and the road width Wtotal is equal to or larger than the first road width threshold W1 and equal to or smaller than the second road width threshold W2, the vehicle driving assist device 10 acquires the first right turn curvature ρright_1 as the traveling road curvature ρm (see FIG. 8B).

When the value of the left turn flag Xleft is "1", the intersection longitudinal width Lcrrng is smaller than the first longitudinal width threshold L1th, and the road width Wtotal is larger than the second road width threshold W2, the vehicle driving assist device 10 acquires a second left turn curvature ρleft_2 as the traveling road curvature ρm (see FIG. 8A). The second left turn curvature ρleft_2 is set smaller than the first left turn curvature ρleft_1.

When the value of the right turn flag Xright is "1", the intersection longitudinal width Lcrrng is smaller than the first longitudinal width threshold L1th, and the road width Wtotal is larger than the second road width threshold W2, the vehicle driving assist device 10 acquires a second right turn curvature ρright_2 as the traveling road curvature ρm (see FIG. 8B). The second right turn curvature ρright_2 is set smaller than the first right turn curvature ρright_1.

When the value of the left turn flag Xleft is "1", the intersection longitudinal width Lcrrng is equal to or larger than the first longitudinal width threshold L1th and equal to or smaller than a second longitudinal width threshold L2th, and the road width Wtotal is smaller than the first road width threshold W1, the vehicle driving assist device 10 acquires the first left turn curvature ρleft_1 as the traveling road curvature ρm (see FIG. 8A). The second longitudinal width threshold L2th is set larger than the first longitudinal width threshold L1th.

When the value of the right turn flag Xright is "1", the intersection longitudinal width Lcrrng is equal to or larger than the first longitudinal width threshold L1th and equal to or smaller than the second longitudinal width threshold L2th, and the road width Wtotal is smaller than the first road width threshold W1, the vehicle driving assist device 10 acquires the first right turn curvature ρright_1 as the traveling road curvature ρm (see FIG. 8B).

When the value of the left turn flag Xleft is "1", the intersection longitudinal width Lcrrng is equal to or larger than the first longitudinal width threshold L1th and equal to or smaller than the second longitudinal width threshold L2th, and the road width Wtotal is equal to or larger than the first road width threshold W1 and equal to or smaller than the second road width threshold W2, the vehicle driving assist device 10 acquires the second left turn curvature ρleft_2 as the traveling road curvature ρm (see FIG. 8A).

When the value of the right turn flag Xright is "1", the intersection longitudinal width Lcrrng is equal to or larger than the first longitudinal width threshold L1th and equal to or smaller than the second longitudinal width threshold L2th, and the road width Wtotal is equal to or larger than the first road width threshold W1 and equal to or smaller than the second road width threshold W2, the vehicle driving assist device 10 acquires the second right turn curvature ρright_2 as the traveling road curvature ρm (see FIG. 8B).

When the value of the left turn flag Xleft is "1", the intersection longitudinal width Lcrrng is equal to or larger than the first longitudinal width threshold L1th and equal to or smaller than the second longitudinal width threshold L2th, and the road width Wtotal is larger than the second road width threshold W2, the vehicle driving assist device 10 acquires a third left turn curvature ρleft_3 as the traveling road curvature ρm (see FIG. 8A). The third left turn curvature ρleft_3 is set smaller than the second left turn curvature ρleft_2.

When the value of the right turn flag Xright is "1", the intersection longitudinal width Lcrrng is equal to or larger than the first longitudinal width threshold L1th and equal to or smaller than the second longitudinal width threshold L2th, and the road width Wtotal is larger than the second road width threshold W2, the vehicle driving assist device 10 acquires a third right turn curvature ρright_3 as the traveling road curvature ρm (see FIG. 8B). The third right turn curvature ρright_3 is set smaller than the second right turn curvature ρright_2.

When the value of the left turn flag Xleft is "1", the intersection longitudinal width Lcrrng is larger than the second longitudinal width threshold L2th, and the road width Wtotal is smaller than the first road width threshold W1, the vehicle driving assist device 10 acquires the second left turn curvature ρleft_2 as the traveling road curvature ρm (see FIG. 8A).

When the value of the right turn flag Xright is "1", the intersection longitudinal width Lcrrng is larger than the second longitudinal width threshold L2th, and the road width Wtotal is smaller than the first road width threshold W1, the vehicle driving assist device 10 acquires the second right turn curvature ρright_2 as the traveling road curvature ρm (see FIG. 8B).

When the value of the left turn flag Xleft is "1", the intersection longitudinal width Lcrrng is larger than the second longitudinal width threshold L2th, and the road width Wtotal is equal to or larger than the first road width threshold W1 and equal to or smaller than the second road width threshold W2, the vehicle driving assist device 10 acquires the third left turn curvature ρleft_3 as the traveling road curvature ρm (see FIG. 8A).

When the value of the right turn flag Xright is "1", the intersection longitudinal width Lcrrng is larger than the second longitudinal width threshold L2th, and the road width Wtotal is equal to or larger than the first road width threshold W1 and equal to or smaller than the second road width threshold W2, the vehicle driving assist device 10 acquires the third right turn curvature ρright_3 as the traveling road curvature ρm (see FIG. 8B).

When the value of the left turn flag Xleft is "1", the intersection longitudinal width Lcrrng is larger than the second longitudinal width threshold L2th, and the road width Wtotal is larger than the second road width threshold W2, the vehicle driving assist device 10 acquires the third left turn curvature ρleft_3 as the traveling road curvature ρm (see FIG. 8A).

When the value of the right turn flag Xright is "1", the intersection longitudinal width Lcrrng is larger than the second longitudinal width threshold L2th, and the road width Wtotal is larger than the second road width threshold W2, the vehicle driving assist device 10 acquires the third right turn curvature ρright_3 as the traveling road curvature ρm (see FIG. 8B).

When determination is made that the driver intends the target vehicle 100 to turn left at the intersection 300 (i.e., when the value of the left turn flag Xleft is "1"), the intersection 300 has two or more possible left-turn roads 500 as shown in FIG. 7, the calculation of the traveling road curvature ρm is started for one of the possible left-turn roads 500, and then the possible left-turn road 500 that the driver intends the target vehicle 100 to enter is determined, the vehicle driving assist device 10 may calculate the traveling road curvature ρm assuming the determined possible left-turn road 500 as an entering left-turn road 500*tgt*.

In this case, the vehicle driving assist device 10 can detect lane lines etc. of any possible left-turn road 500 from the camera image information IC. When the lane of the possible left-turn road 500 is identified and the target vehicle 100 is predicted to enter the possible left-turn road 500, the vehicle driving assist device 10 determines the possible left-turn road 500 as the possible left-turn road 500 that the driver intends the target vehicle 100 to enter (entering left-turn road 500*tgt*).

Figure 9:
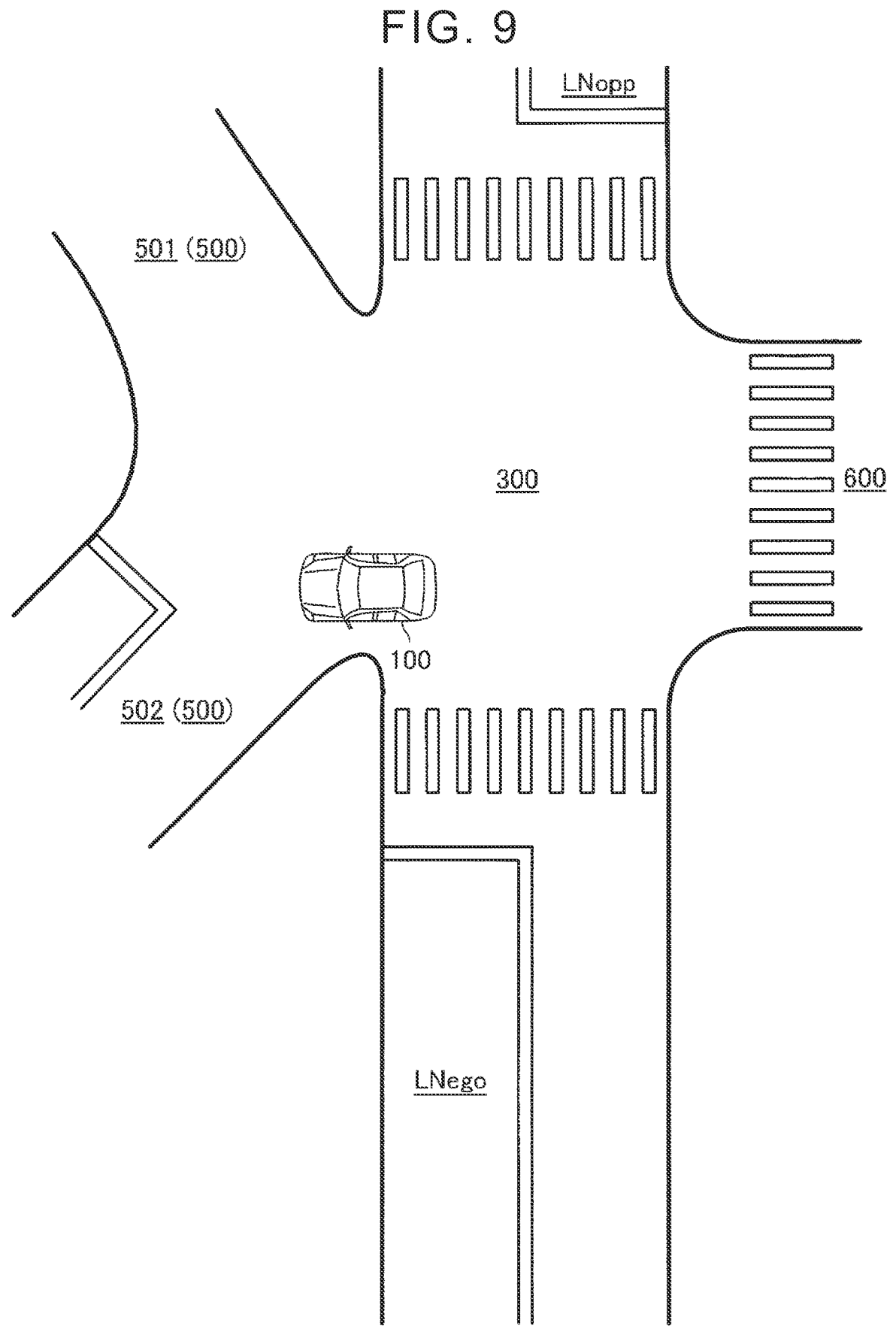

For example, when the target vehicle 100 approaches the near-side possible left-turn road 502 while the driver is turning the target vehicle 100 to the left to enter the possible left-turn road 502 as shown in FIG. 9, lane lines etc. of the possible left-turn road 502 can be detected from the camera image information IC. The vehicle driving assist device 10 can determine the possible left-turn road 502 as the possible left-turn road 500 that the driver intends the target vehicle 100 to enter (entering left-turn road 500*tgt*).

Alternatively, when a guide steering angle δguide close to a convergence value on the actual steering angle is identified among the guide steering angles δguide to be set when entering the possible left-turn roads 500, the vehicle driving assist device 10 determines the possible left-turn road 500 associated with the identified guide steering angle δguide as the possible left-turn road 500 that the driver intends the target vehicle 100 to enter (entering left-turn road 500*tgt*).

For example, when the intersection 300 has two possible left-turn roads 500 and the target vehicle 100 starts to turn left as shown in FIG. 9, a guide steering angle δguide for the far-side possible left-turn road 501 (guide steering angle δguide_1) and a guide steering angle δguide for the near-side possible left-turn road 502 (guide steering angle δguide_2) are acquired.

The same parameter as the intersection lateral width Wcrrng is used as a parameter indicating the lateral size of the intersection 300 that is used when acquiring the guide steering angle δguide_2 for the near-side possible left-turn road 502. As the parameter indicating the lateral size of the intersection 300, an intersection longitudinal width Lcrrng acquired based on an intersection of a center line of the target-vehicle traveling lane LNego and a center line of a lane where the target vehicle 100 is to travel on the near-side possible left-turn road 502 is used instead of the intersection longitudinal width Lcrrng acquired based on the target-vehicle traveling road connection portion 550.

Figure 10A:
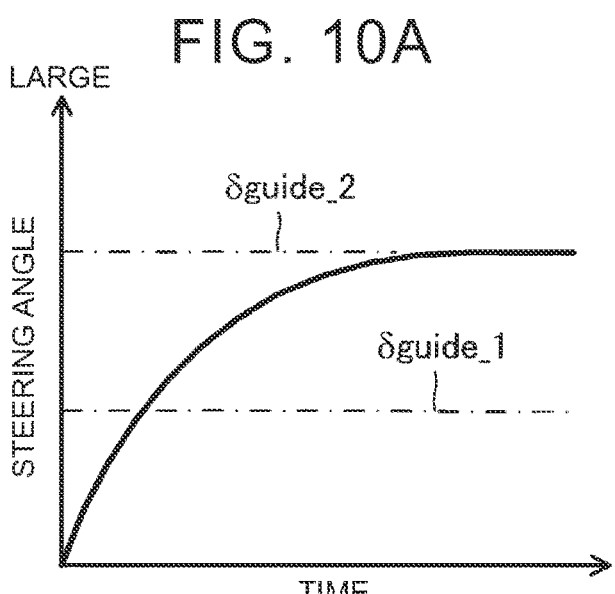
FIG. 10A is a diagram showing a change in a steering angle in a situation where the target vehicle enters the near-side possible left-turn road.

In this case, as shown in FIG. 10A, the guide steering angle δguide_2 for the near-side possible left-turn road 502 is larger than the guide steering angle δguide_1 for the far-side possible left-turn road 501. When the driver intends the target vehicle 100 to enter the near-side possible left-turn road 502, the actual steering angle is close to the guide steering angle δguide_2 for the near-side possible left-turn road 502 over the guide steering angle δguide_1 for the far-side possible left-turn road 501. At this time, the vehicle driving assist device 10 determines the near-side possible left-turn road 502 as the possible left-turn road 500 that the driver intends the target vehicle 100 to enter (entering left-turn road 500*tgt*).

Alternatively, when increase rates of the actual steering angle (steering angle rates Rp) are estimated based on the guide steering angles Sguide to be set when entering the possible left-turn roads 500 and a steering angle rate Rp close to an actual steering angle rate (increase rate of the actual steering angle) is identified among the estimated steering angle rates Rp, the vehicle driving assist device 10 determines the possible left-turn road 500 associated with the identified steering angle rate Rp as the entering left-turn road 500*tgt*.

For example, when the intersection 300 has two possible left-turn roads 500 and the target vehicle 100 starts to turn left as shown in FIG. 9, the guide steering angle δguide_1 for the possible left-turn road 501 farthest from the target vehicle 100, that is, the far-side possible left-turn road 501, and the guide steering angle δguide_2 for the near-side possible left-turn road 502 are acquired.

Figure 10B:
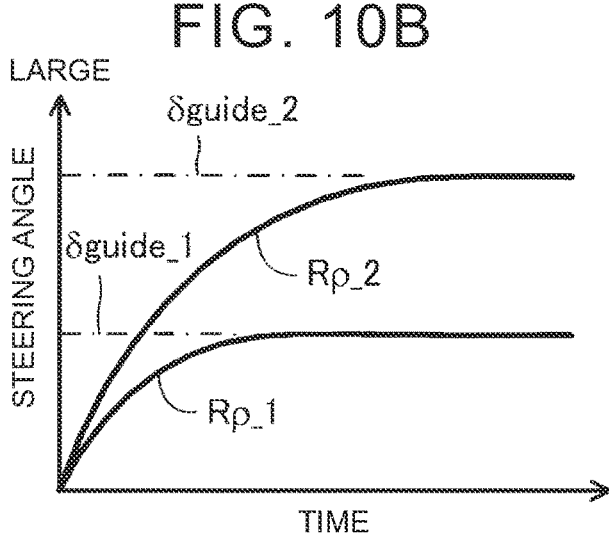
FIG. 10B is a diagram showing a change in the steering angle in a situation where the target vehicle enters a far-side possible left-turn road and the change in the steering angle in the situation where the target vehicle enters the near-side possible left-turn road.

In this case, as shown in FIG. 10B, the guide steering angle δguide_2 for the near-side possible left-turn road 502 is larger than the guide steering angle δguide_1 for the far-side possible left-turn road 501 as described above.

When the driver intends the target vehicle 100 to enter the near-side possible left-turn road 502, the actual steering angle rate Rρ (increase rate of the actual steering angle) is close to a steering angle rate Rρ_2 when the target vehicle 100 enters the near-side possible left-turn road 502 instead of a steering angle rate Rρ_1 when the target vehicle 100 enters the far-side possible left-turn road 501. At this time, the vehicle driving assist device 10 determines the near-side possible left-turn road 502 as the entering left-turn road 500*tgt*.

When determination is made that the driver intends the target vehicle 100 to turn right at the intersection 300 (i.e., when the value of the right turn flag Xright is "1"), the intersection 300 has two or more possible right-turn roads 600, the calculation of the traveling road curvature ρm is started for one of the possible right-turn roads 600, and then the possible right-turn road 600 that the driver intends the target vehicle 100 to enter is determined, the vehicle driving assist device 10 may similarly calculate the traveling road curvature ρm assuming the determined possible right-turn road 600 as an entering right-turn road 600*tgt*.

As can be seen from the above description, the vehicle driving assist device 10 acquires the longitudinal size (intersection longitudinal width Lcrrng) and the lateral size (intersection lateral width Wcrrng) of the intersection 300 with respect to the target vehicle 100. The vehicle driving assist device 10 acquires the size of the intersection 300 based on the longitudinal size and the lateral size. The vehicle driving assist device 10 acquires the traveling road curvature ρm based on the size of the intersection 300.

Next, the vehicle driving assist device 10 advances the process to step S225, and sets a guide steering angle δguide. In this example, the vehicle driving assist device 10 sets a smaller guide steering angle δguide as the traveling road curvature ρm acquired in step S220 is smaller. In other words, the vehicle driving assist device 10 sets a smaller guide steering angle δguide as the scale of the intersection 300 is larger.

When the scale of the intersection 300 is large, the steering angle required to turn right or left at the intersection 300 may be small. Therefore, when the driver operates the steering wheel 31 excessively, the target vehicle 100 cannot turn right or left along an appropriate traveling road.

The vehicle driving assist device 10 increases the steering reaction force to be applied to the steering wheel 31 when the scale of the intersection 300 is large. Therefore, it is possible to suppress the driver's excessive operation on the steering wheel 31.

When the scale of the intersection 300 is small, the steering angle required to turn right or left at the intersection 300 is large. Therefore, when the driver's steering wheel operation is insufficient, the target vehicle 100 cannot turn right or left along an appropriate traveling road.

The vehicle driving assist device 10 reduces the steering reaction force to be applied to the steering wheel 31 when the scale of the intersection 300 is small. Therefore, it is possible to suppress the insufficient driver's steering wheel operation.

Next, the vehicle driving assist device 10 advances the process to step S230, and acquires a guide steering angle difference Δδguide. The acquired guide steering angle difference Δδguide is a difference between the guide steering angle δguide acquired in step S225 and the actual steering angle δ at that time. In this example, the guide steering angle difference Δδguide is acquired from Equation 7.

$$\Delta\delta guide = \delta guide - \delta \qquad (7)$$

Next, the vehicle driving assist device 10 advances the process to step S235, and sets a target steering reaction force RFtgt based on the guide steering angle difference Δδguide acquired in step S230.

At this time, the vehicle driving assist device 10 sets a smaller target steering reaction force RFtgt as the guide steering angle difference Δδguide acquired in step S230 is larger in a positive direction. The vehicle driving assist device 10 sets a larger target steering reaction force RFtgt as the guide steering angle difference Δδguide acquired in step S230 is larger in a negative direction. That is, the vehicle driving assist device 10 sets the target steering reaction force RFtgt to apply the steering reaction force to the steering wheel 31 so that the guide steering angle difference Δδguide decreases, that is, the actual steering angle δ approaches the guide steering angle δguide.

The vehicle driving assist device 10 may set the target steering reaction force RFtgt by using an arithmetic expression. The vehicle driving assist device 10 may set the target steering reaction force RFtgt by storing a map of the target steering reaction force RFtgt that uses the guide steering angle difference 4δguide as an argument and applying the guide steering angle difference 4δguide to the map.

When the guide steering angle difference Δδguide acquired in step S230 is zero, the vehicle driving assist device 10 sets a normal steering reaction force (normal steering reaction force RFnormal) larger than zero as the target steering reaction force RFtgt.

Next, the vehicle driving assist device 10 advances the process to step S240, and applies a steering reaction force corresponding to the target steering reaction force RFtgt set in step S235 to the steering wheel 31. Then, the vehicle driving assist device 10 advances the process to step S295, and temporarily terminates the process of this routine.

As described above, the guide steering angle δguide can be set by using the size of the intersection 300 even in the situation where the driver turns the target vehicle 100 to the right or left at the intersection 300. Therefore, a steering reaction force that allows the driver to smoothly perform the steering operation can be applied to the steering operation (steering wheel 31).

When the determination result is "No" in step S205 or S215, the vehicle driving assist device 10 advances the process to step S245, and sets (resets) the value of the left turn flag Xleft to "0". Next, the vehicle driving assist device 10 advances the process to step S250, and sets (resets) the value of the right turn flag Xright to "0".

Next, the vehicle driving assist device 10 advances the process to step S255, and determines whether a curve entry condition CC is satisfied.

The curve entry condition CC is a condition that a curved road that the target vehicle 100 is predicted to enter within a predetermined period (entry-predicted curved road) is detected. Therefore, the curve entry condition CC is satisfied when the entry-predicted curved road is detected, and is then unsatisfied when the target vehicle 100 finishes traveling on the entry-predicted curved road. Thus, the curve entry condition CC is satisfied while the target vehicle 100 is traveling on the entry-predicted curved road after the entry-predicted curved road is detected, and is unsatisfied otherwise.

The vehicle driving assist device 10 determines whether the curve entry condition CC is satisfied based on the camera image information IC. The vehicle driving assist device 10 may determine whether the curve entry condition CC is satisfied based on a position of the target vehicle 100 determined from a GPS signal and the map information in the map information database.

When driving the target vehicle 100 along the curved road, the driver rotates the steering wheel 31. When driving the target vehicle 100 along a sharply curved road, the driver needs to rotate the steering wheel 31 more quickly than when driving the target vehicle 100 along a gently curved road. If the steering reaction force to be applied to the steering wheel 31 is constant between the case where the target vehicle 100 travels along a sharply curved road and the case where the target vehicle 100 travels along a gently curved road, there is a possibility that the steering wheel operation delays when the target vehicle 100 travels along the sharply curved road and the target vehicle 100 cannot smoothly travel along the curved road.

In view of the above, the vehicle driving assist device 10 adjusts the steering reaction force based on a curvature of a curved road where the driver intends to drive the target vehicle 100 so that the driver can smoothly drive the target vehicle 100 along the curved road.

For this purpose, the vehicle driving assist device 10 determines in step S255 whether the curve entry condition CC is satisfied.

Figure 4:
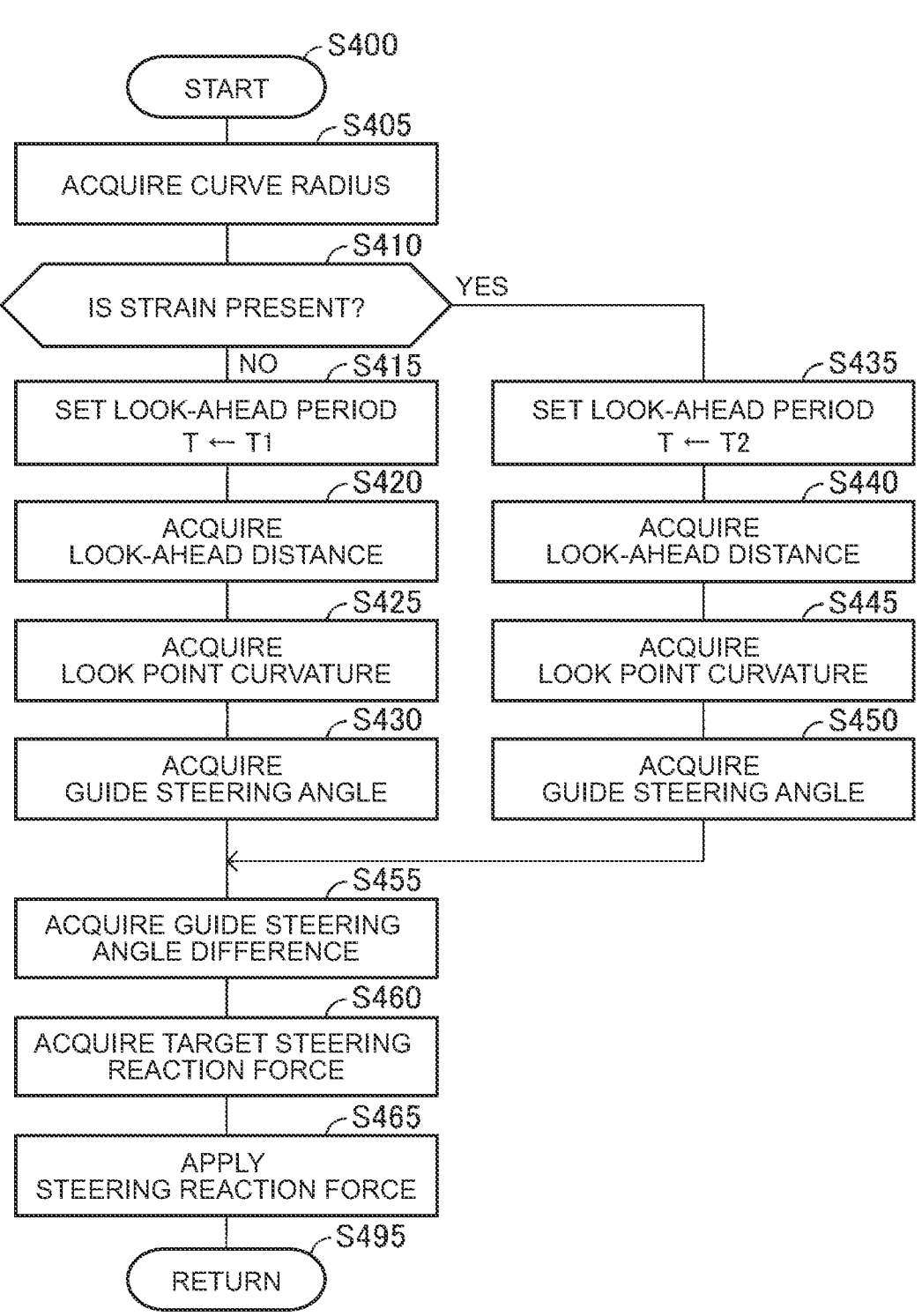
FIG. 4 is a flowchart showing a routine to be executed by the vehicle driving assist device according to the embodiment.
Figure 5:
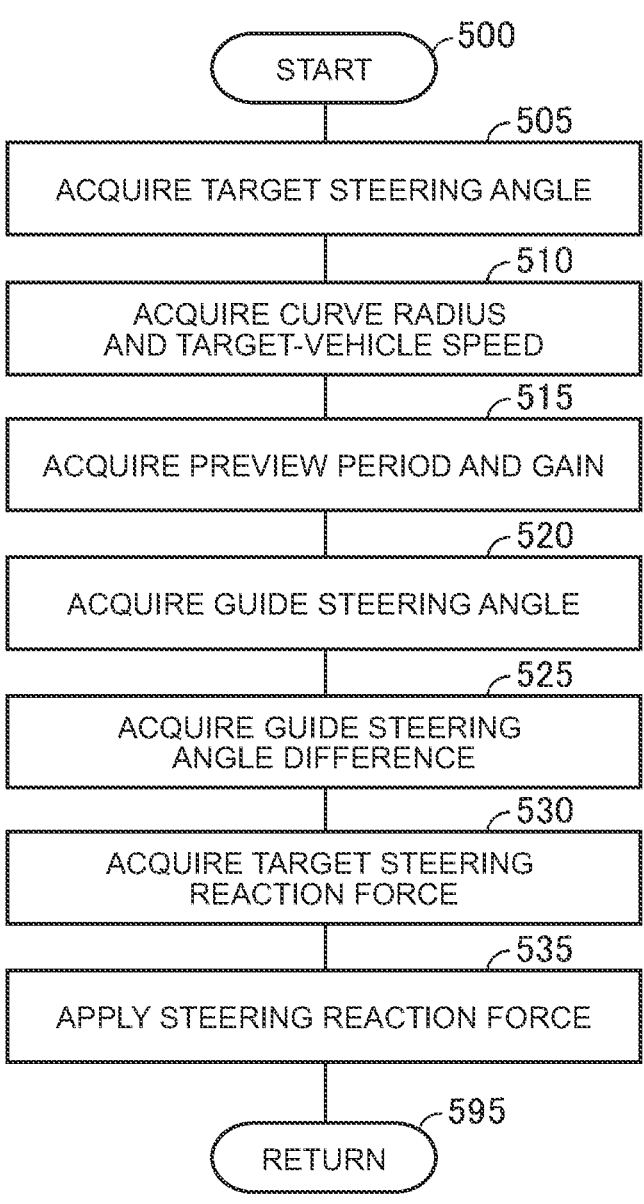
FIG. 5 is a flowchart showing a routine to be executed by the vehicle driving assist device according to the embodiment.

When the determination result is "Yes" in step S255, the vehicle driving assist device 10 advances the process to step S260, and executes a routine shown in FIG. 4 or 5. When the vehicle driving assist device 10 is configured to execute the routine shown in FIG. 4 and advances the process to step S260, the vehicle driving assist device 10 starts the process from step S400 of FIG. 4, and advances the process to step S405 to acquire a curve radius R.

The curve radius R is the minimum curve radius of a curved road that the target vehicle 100 is predicted to enter (entry-predicted curved road). Particularly in this example, the curve radius R is the minimum curvature radius of a middle line between a left lane line MB_L and a right lane line MB_R that define the target-vehicle traveling lane LNego on the entry-predicted curved road.

The left lane line MB_L and the right lane line MB_R are acquired from the camera image information IC. Therefore, the curve radius R is acquired from the camera image information IC.

Next, the vehicle driving assist device 10 advances the process to step S410, and determines whether strain is present.

The degree of strain in this example indicates a point ahead of the target vehicle 100 (look-ahead point) at which the driver is presumed to look when the driver causes the target vehicle 100 to enter the curved road. When determination is made that the degree of strain is high (i.e., when determination is made that strain is present), the degree of strain indicates that the look-ahead point is a relatively far point ahead of the target vehicle 100. When determination is made that the degree of strain is low (i.e., when determination is made that strain is not present), the degree of strain indicates that the look-ahead point is a relatively near point ahead of the target vehicle 100.

In this example, the presence or absence of strain is determined based on the curve radius R acquired in step S405 and the current target-vehicle speed V.

Figure 11:
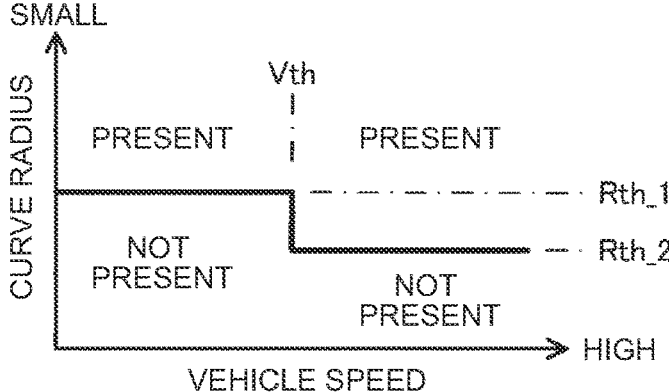
FIG. 11 is a diagram showing the presence or absence of strain to be determined based on a traveling speed of the target vehicle (target-vehicle speed) and a curve radius.

More specifically, as shown in FIG. 11, the vehicle driving assist device 10 determines that strain is not present when the target-vehicle speed V is in a range lower than a predetermined vehicle speed Vth and the curve radius R is larger than a predetermined value (first radius Rth_1). The vehicle driving assist device 10 determines that strain is present when the curve radius R is equal to or smaller than the first radius Rth_1.

The vehicle driving assist device 10 determines that strain is not present when the target-vehicle speed V is in a range equal to or higher than the predetermined vehicle speed Vth and the curve radius R is larger than a predetermined value (second radius Rth_2) larger than the first radius Rth_1. The vehicle driving assist device 10 determines that strain is present when the curve radius R is equal to or smaller than the second radius Rth_2.

In this example, the vehicle driving assist device 10 determines the presence or absence of strain based on both the curve radius R and the target-vehicle speed V, but may determine the presence or absence of strain based only on the curve radius R.

When the determination result is "No" in step S410, the vehicle driving assist device 10 advances the process to step S415, and sets a look-ahead period T to a first period T1.

Next, the vehicle driving assist device 10 advances the process to step S420, and acquires a look-ahead distance D by using the look-ahead period T (first period T1) set in step S415 and the target-vehicle speed V.

The look-ahead distance D is a distance from the target vehicle 100 to the point at which the driver is presumed to look (look-ahead point). In this example, the look-ahead distance D is acquired by calculation according to Equation 8.

$$D = V \times T \tag{8}$$

Next, the vehicle driving assist device 10 advances the process to step S425, and detects the left lane line MB_L and the right lane line MB_R of the target-vehicle traveling lane LNego based on the camera image information IC. The vehicle driving assist device 10 acquires a look point curvature pw by using the left lane line MB_L, the right lane line MB_R, and the look-ahead distance D acquired in step S420 (see FIGS. 12A and 12B).

The look point curvature pw is a curvature of the target-vehicle traveling lane LNego ahead of the target vehicle 100 at the look-ahead distance D, that is, a curvature of the target-vehicle traveling lane LNego at a point ahead of the target vehicle 100 at which the driver facing the curved road having the curve radius R is presumed to look. When the curve radius R is small, a curvature of the target-vehicle traveling lane LNego at a farther point ahead of the target vehicle 100 than the point when the curve radius R is large is acquired as the look point curvature pw.

Figures 12A, 12B:
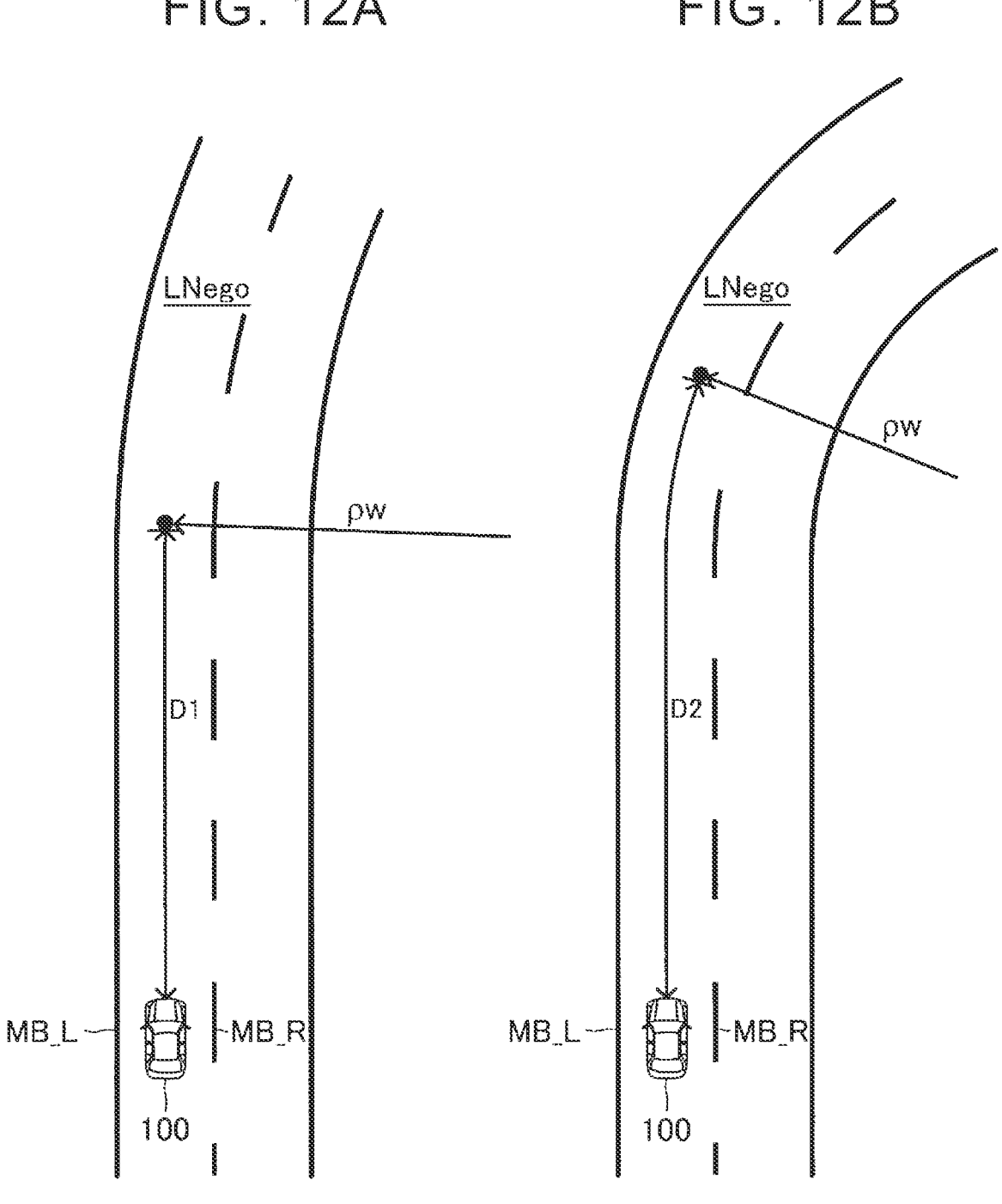
FIG. 12A is a diagram showing a situation where the target vehicle enters a gently curved road.
FIG. 12B is a diagram showing a situation where the target vehicle enters a sharply curved road.

For example, when the curve radius R is large as shown in FIG. 12A (i.e., when the curved road that the target vehicle 100 is predicted to enter is a gently curved road), the vehicle driving assist device 10 acquires, as the look point curvature pw, a curvature of the target-vehicle traveling lane LNego ahead of the target vehicle 100 at a first distance D1.

When the curve radius R is small as shown in FIG. 12B (i.e., when the curved road that the target vehicle 100 is predicted to enter is a sharply curved road), the vehicle driving assist device 10 acquires, as the look point curvature pw, a curvature of the target-vehicle traveling lane LNego ahead of the target vehicle 100 at a second distance D2 longer than the first distance D1.

Therefore, when the acquired curve radius R is small, the vehicle driving assist device 10 acquires, as the look point curvature pw, the curvature of the target-vehicle traveling road RD at a farther point ahead of the target vehicle 100 than the point when the acquired curve radius R is large.

When a difference between the look point curvature pw currently acquired in step S425 and a look point curvature pw used to set the target steering reaction force RFtgt immediately before the look point curvature pw is acquired in step S425 or the traveling road curvature pm is larger than a predetermined value, a look point curvature pw corrected so that the difference is equal to or smaller than the predetermined value may be used as the look point curvature pw acquired in step S425. That is, the look point curvature pw acquired in step S425 may be changed gradually.

Next, the vehicle driving assist device 10 advances the process to step S430, and acquires a guide steering angle δguide by using the look point curvature pw acquired in step S425.

In this example, the guide steering angle δguide is acquired by calculation according to Equation 9. In Equation 9, the symbol "n" is a gear ratio of the steering box. The symbol "K" is a coefficient (adapted value) obtained through experiments etc. so that the guide steering angle δguide can be acquired by Equation 9 as a value at which the target vehicle 100 can smoothly travel along a curved road. The symbol "A" is a so-called stability factor. The symbol "V" is a target-vehicle speed. The symbol "L" is a wheelbase of the target vehicle 100.

$$\delta guide = n \times K \times \left(1 + A \times V^2\right) \times L \times \rho w \tag{9}$$

Next, the vehicle driving assist device 10 advances the process to step S455, and acquires a guide steering angle difference Δδguide. The acquired guide steering angle difference Δδguide is a difference between the guide steering angle δguide acquired in step S430 and the actual steering angle δ at that time. In this example, the guide steering angle difference Δδguide is acquired from Equation 10.

$$\Delta\delta guide = \delta guide - \delta \tag{10}$$

Next, the vehicle driving assist device 10 advances the process to step S460, and acquires a target steering reaction force RFtgt by using the guide steering angle difference Δδguide acquired in step S455.

At this time, the vehicle driving assist device 10 sets a smaller target steering reaction force RFtgt as the guide steering angle difference Δδguide acquired in step S455 is larger in a positive direction. The vehicle driving assist device 10 sets a larger target steering reaction force RFtgt as the guide steering angle difference Δδguide acquired in step S455 is larger in a negative direction. That is, the vehicle driving assist device 10 sets the target steering reaction force RFtgt to apply the steering reaction force to the steering wheel 31 so that the guide steering angle difference Δδguide decreases, that is, the actual steering angle δ approaches the guide steering angle δguide.

The vehicle driving assist device 10 may set the target steering reaction force RFtgt by using an arithmetic expression. The vehicle driving assist device 10 may set the target steering reaction force RFtgt by storing a map of the target steering reaction force RFtgt that uses the guide steering angle difference Δδguide as an argument and applying the guide steering angle difference Δδguide to the map.

When the guide steering angle difference Δδguide is zero, the vehicle driving assist device 10 sets the normal steering reaction force (normal steering reaction force RFnormal) larger than zero as the target steering reaction force RFtgt.

Next, the vehicle driving assist device 10 advances the process to step S465, and applies a steering reaction force corresponding to the target steering reaction force RFtgt acquired in step S460 to the steering wheel 31. Then, the vehicle driving assist device 10 advances the process to step S495, and temporarily terminates the process of this routine.

In this example, a smaller steering reaction force is applied to the steering wheel 31 as the look point curvature pw increases.

When the determination result is "Yes" in step S410, the vehicle driving assist device 10 advances the process to step S435, and sets the look-ahead period T to a second period T2 longer than the first period T1.

Next, the vehicle driving assist device 10 advances the process to step S440, and acquires a look-ahead distance D by calculation according to Equation 8 using the look-ahead period T (second period T2) set in step S435.

Since the second period T2 is longer than the first period T1, the look-ahead distance D acquired when determination is made that strain is present is longer than the look-ahead distance D acquired when determination is made that strain is not present.

Next, the vehicle driving assist device 10 advances the process to step S445, and acquires a look point curvature pw as described above by using the look-ahead distance D acquired in step S440.

When a difference between the look point curvature pw currently acquired in step S445 and a look point curvature pw used to set the target steering reaction force RFtgt immediately before the look point curvature pw is acquired in step S445 or the traveling road curvature ρm is larger than a predetermined value, a look point curvature pw corrected so that the difference is equal to or smaller than the predetermined value may be used as the look point curvature pw acquired in step S445. That is, the look point curvature pw acquired in step S445 may be changed gradually.

Next, the vehicle driving assist device 10 advances the process to step S450, and acquires a guide steering angle δguide by calculation according to Equation 9 using the look point curvature pw acquired in step S445.

Since the look-ahead distance D when strain is present is longer than the look-ahead distance D when strain is not present, the look point curvature pw acquired when strain is present tends to be larger than the look point curvature pw acquired when strain is not present.

Next, the vehicle driving assist device 10 advances the process to step S455, and acquires a guide steering angle difference Δδguide by calculation according to Equation 10 using the guide steering angle δguide acquired in step S450.

Next, the vehicle driving assist device 10 advances the process to step S460, and acquires a target steering reaction force RFtgt as described above by using the guide steering angle difference Δδguide acquired in step S455.

Next, the vehicle driving assist device 10 advances the process to step S465, and applies a steering reaction force corresponding to the target steering reaction force RFtgt acquired in step S460 to the steering wheel 31. Then, the vehicle driving assist device 10 advances the process to step S495, and temporarily terminates the process of this routine.

Figure 13A:
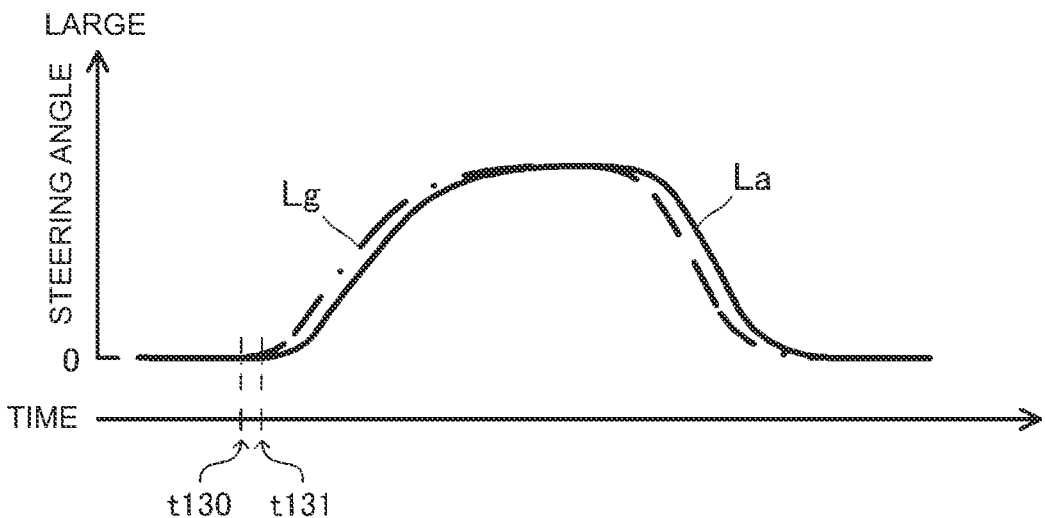
FIG. 13A is a diagram showing a relationship between a guide steering angle and an actual steering angle in the situation where the target vehicle enters the gently curved road.

When the target vehicle 100 is predicted to enter a gently curved road, the acquired guide steering angle δguide changes as shown in FIG. 13A. In FIG. 13A, a line Lg indicates a change in the guide steering angle δguide. A line La indicates a change in the actual steering angle δ. At time t130, the guide steering angle δguide starts to increase from zero. At time t131, the actual steering angle δ starts to increase from zero.

Figure 13B:
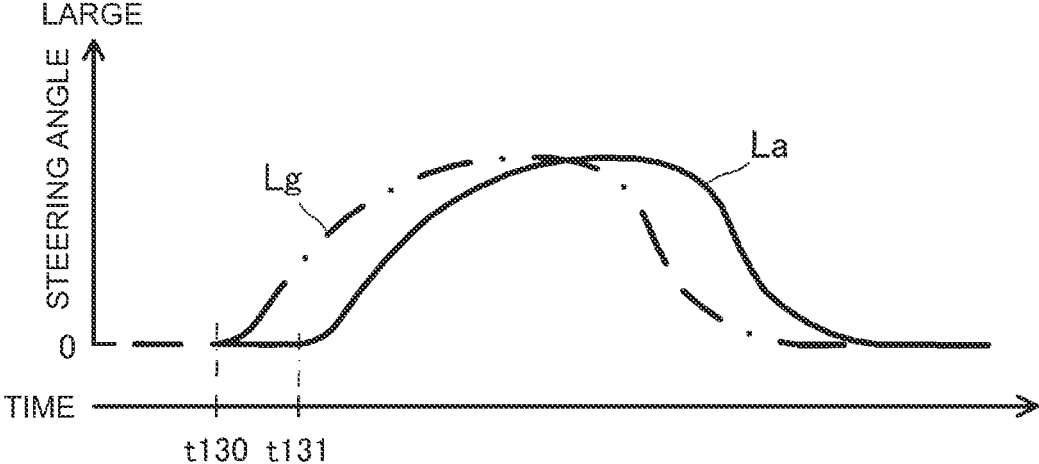
FIG. 13B is a diagram showing a relationship between the guide steering angle and the actual steering angle in the situation where the target vehicle enters the sharply curved road.

When the target vehicle 100 is predicted to enter a sharply curved road, the acquired guide steering angle δguide changes as shown in FIG. 13B. In FIG. 13B, a line Lg indicates a change in the guide steering angle δguide. A line La indicates a change in the actual steering angle δ. At time t130, the guide steering angle δguide starts to increase from zero. At time t131, the actual steering angle δ starts to increase from zero.

Comparison between the change in the guide steering angle δguide shown in FIG. 13A and the change in the guide steering angle δguide shown in FIG. 13B demonstrates that, when the curved road that the target vehicle 100 is predicted to enter (entry-predicted curved road) is a sharply curved road, the guide steering angle δguide increases at a timing earlier than that when the entry-predicted curved road is a gently curved road. Thus, when the entry-predicted curved road is a sharply curved road, the steering reaction force is reduced at a timing earlier than that when the entry-predicted curved road is a gently curved road. Accordingly, when the target vehicle 100 approaches a sharply curved road and the driver starts to rotate the steering wheel 31, the steering reaction force has already been reduced. Therefore, the driver can quickly rotate the steering wheel 31. As a result, even if the curved road is a sharply curved road, the target vehicle 100 can smoothly travel along the curved road. Thus, the vehicle driving assist device 10 can adjust the steering reaction force so that the driver can smoothly drive the target vehicle 100 along the curved road.

When the entry-predicted curved road is a sharply curved road, the guide steering angle δguide increases or decreases in advance of the change in the actual steering angle δ while the target vehicle 100 is traveling along the entry-predicted curved road. Therefore, even if the curved road is a sharply curved road, the target vehicle 100 can smoothly travel along the curved road.

When the entry-predicted curved road is a gently curved road, the guide steering angle δguide increases or decreases in analogy to the change in the actual steering angle δ while the target vehicle 100 is traveling along the entry-predicted curved road. Therefore, the steering reaction force is adjusted in analogy to that for an actual steering wheel rotation operation of the driver.

When the vehicle driving assist device 10 is configured to execute the routine shown in FIG. 5 and advances the process to step S260 of the routine shown in FIG. 2, the vehicle driving assist device 10 starts the process from step S500 of FIG. 5. The vehicle driving assist device 10 advances the process to step S505, and acquires a target steering angle δtgt.

The target steering angle δtgt is an actual steering angle δ in accordance with a target of change in the steering angle (steering angle change target) for causing the target vehicle 100 to suitably travel along a curved road. In this example, the target steering angle δtgt is acquired by calculation according to Equation 11.

$$\delta tgt = f(t) \tag{11}$$

In Equation 11, "t" is a time at which the driver starts to rotate the steering wheel 31 from the neutral position to drive the target vehicle 100 along the curved road (steering wheel operation start time). Therefore, in Equation 11, "f (t)" is a function whose variable is the steering wheel operation start time t.

Next, the vehicle driving assist device 10 advances the process to step S510, and acquires a curve radius R and a target-vehicle speed V.

Next, the vehicle driving assist device 10 advances the process to step S515, and acquires a preview period τ and a gain "a" by using the curve radius R and the target-vehicle speed V acquired in step S510.

The preview period τ is a period for advancing the time to start the setting of the guide steering angle δguide. In this example, the preview period τ and the gain "a" are acquired by applying the curve radius R and the target-vehicle speed V to Equations 12 and 13.

$$\tau = H(R, V) \tag{12}$$

$$a = G(R, V) \tag{13}$$

In Equation 12, "H (R, V)" is a function whose variables are the curve radius R and the target-vehicle speed V. According to Equation 12, when the curve radius R is small, a longer preview period τ is acquired as compared with a case where the curve radius R is large. In particular, a longer preview period τ is acquired as the curve radius R decreases. According to Equation 12, when the curve radius R is larger than zero, a preview period τ larger than zero is acquired. According to Equation 12, when the target-vehicle speed V is high, a longer preview period τ is acquired as compared with a case where the target-vehicle speed V is low. In particular, a longer preview period τ is acquired as the target-vehicle speed V increases.

In Equation 13, "G (R, V)" is a function whose variables are the curve radius R and the target-vehicle speed V. According to Equation 13, when the curve radius R is small, a gain "a" having a smaller value is acquired as compared with the case where the curve radius R is large. In particular, a gain "a" having a smaller value is acquired as the curve radius R decreases. According to Equation 13, when the target-vehicle speed V is high, a smaller gain "a" is acquired as compared with the case where the target-vehicle speed V is low. In particular, a smaller gain "a" is acquired as the target-vehicle speed V increases. The gain "a" acquired from Equation 13 is a value larger than zero and equal to or smaller than "1". According to Equation 13, when the curve radius R is larger than zero, at least a gain "a" smaller than "1" is acquired.

A linear expression, a quadratic expression, or a sigmoid function can be used as each of the function H (R, V) and the function G (R, V). Alternatively, each of the function H (R, V) and the function G (R, V) may be stored in the form of a map (or a look-up table), and the preview period τ and the gain "a" may be acquired by applying the curve radius R and the target-vehicle speed V to the map. Alternatively, the presence or absence of strain may be determined based on the target-vehicle speed V and the curve radius R as described above. A relatively short period is set as the preview period τ when strain is not present. A period longer than that period is set as the preview period τ when strain is present.

Next, the vehicle driving assist device 10 advances the process to step S520, and acquires a guide steering angle δguide by using the preview period τ and the gain "a"

acquired in step S515. In this example, the guide steering angle δguide is acquired by calculation according to Equation 14.

$$\delta guide = a \times f(t - \tau) \tag{14}$$

In Equation 14, "t" is the steering wheel operation start time.

Figure 14A:
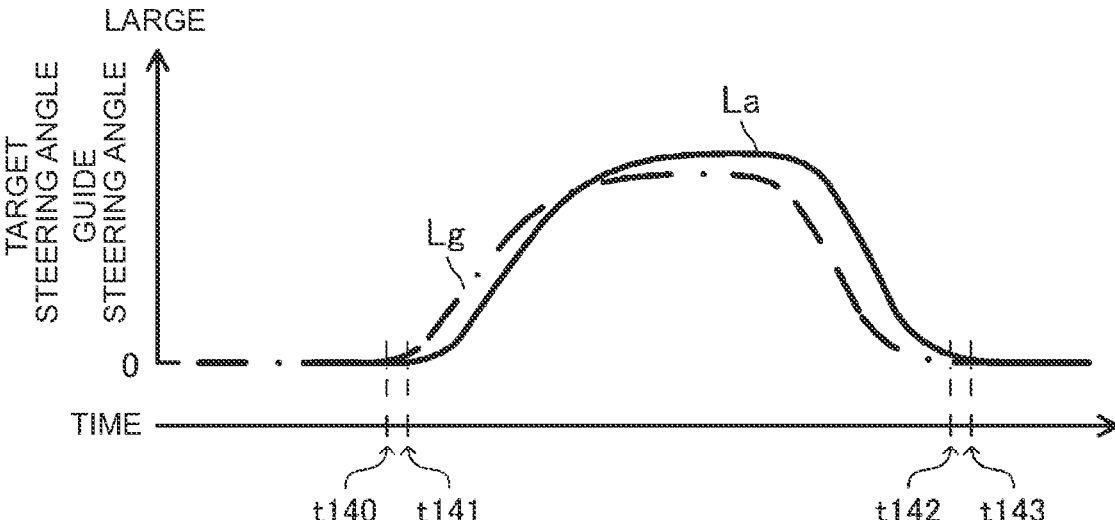
FIG. 14A is a diagram showing changes in the guide steering angle and a target steering angle to be set when the curve radius is large and the target-vehicle speed is low.
Figure 14B:
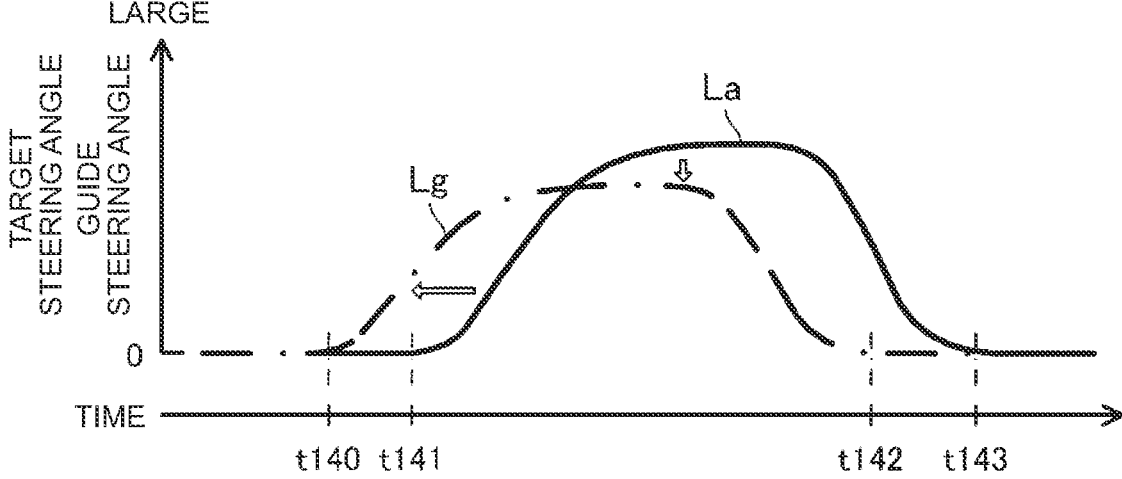
FIG. 14B is a diagram showing changes in the guide steering angle and the target steering angle to be set when the curve radius is small and the target-vehicle speed is high.

The target steering angle δtgt acquired from Equation 14 starts to be larger than zero at time t141 (steering wheel operation start time t) as indicated by a line La in FIGS. 14A and 14B. With an elapse of time, the target steering angle δtgt gradually increases. After the target steering angle δtgt reaches its maximum value, the target steering angle δtgt gradually decreases. The target steering angle δtgt reaches zero at time t143 at which the target vehicle 100 finishes traveling on the curved road.

The guide steering angle δguide acquired from Equation 14 starts to be larger than zero at time t140 earlier than time t141 (steering wheel operation start time t) as indicated by a line Lg in FIGS. 14A and 14B. With an elapse of time, the guide steering angle δguide gradually increases. After the guide steering angle δguide reaches its maximum value δmax, the guide steering angle δguide gradually decreases. The guide steering angle δguide reaches zero at time t142 earlier than time t143 at which the target vehicle 100 finishes traveling on the curved road.

In this example, when a curved road is detected and the curve radius R of the curved road is acquired, a preview period τ larger than zero is set. Therefore, the setting of the guide steering angle δguide is started at time t140 earlier than the steering wheel operation start time t (time t141). In other words, the guide steering angle δguide is larger than zero from time t140 earlier than the steering wheel operation start time t (time 141).

In this example, when a curved road is detected and the curve radius R of the curved road is acquired, a gain "a" smaller than "1" is set. Therefore, the maximum value δmax of the guide steering angle δguide is smaller than the maximum value of the target steering angle δtgt.

When the curve radius R is small, the preview period τ is set longer than that when the curve radius R is large. Therefore, when the curve radius R is small, time t140 at which the setting of the guide steering angle δguide is started is earlier than the steering wheel operation start time t (time t141) as compared with the case where the curve radius R is large.

When the target-vehicle speed V is high, the preview period τ is set longer than that when the target-vehicle speed V is low. Therefore, when the target-vehicle speed V is high, time t140 at which the setting of the guide steering angle δguide is started is earlier than the steering wheel operation start time t (time t141) as compared with the case where the target-vehicle speed V is low.

When the curve radius R is small, the gain "a" is set to a smaller value than that when the curve radius R is large. Therefore, when the curve radius R is small, the maximum value δmax of the guide steering angle δguide is set to a smaller value than that when the curve radius R is large.

When the target-vehicle speed V is high, the gain "a" is set to a smaller value than that when the target-vehicle speed V is low. Therefore, when the target-vehicle speed V is high, the maximum value δmax of the guide steering angle δguide is set to a smaller value than that when the target-vehicle speed V is low.

From the above, the guide steering angle δguide changes with the elapse of time as indicated by the line Lg in FIG. 14A when the curve radius R is large and the target-vehicle speed V is low. The guide steering angle δguide changes with the elapse of time as indicated by the line Lg in FIG. 14B when the curve radius R is small and the target-vehicle speed V is high.

Next, the vehicle driving assist device 10 advances the process to step S525, and acquires a difference between the guide steering angle δguide acquired in step S520 and the actual steering angle δ as a guide steering angle difference Δδguide by calculation according to Equation 10.

Next, the vehicle driving assist device 10 advances the process to step S530, and acquires a target steering reaction force RFtgt as described above based on the guide steering angle difference Δδguide acquired in step S525.

Next, the vehicle driving assist device 10 advances the process to step S535, and applies a steering reaction force corresponding to the target steering reaction force RFtgt acquired in step S530 to the steering wheel 31. Then, the vehicle driving assist device 10 advances the process to step S595, and temporarily terminates the process of this routine.

Therefore, when the actual steering angle is smaller than the guide steering angle δguide, the vehicle driving assist device 10 sets the steering reaction force to be smaller than the normal steering reaction force as the difference of the actual steering angle from the guide steering angle δguide (guide steering angle difference 4δguide) increases. When the actual steering angle is larger than the guide steering angle δguide, the vehicle driving assist device 10 sets the steering reaction force to be larger than the normal steering reaction force as the difference of the actual steering angle from the guide steering angle δguide (guide steering angle difference Δδguide) increases.

When the steering reaction force is reduced at the time at which the driver starts the steering wheel operation for driving the target vehicle 100 along the curved road (steering wheel operation start time t), the driver can easily operate the steering wheel for driving the target vehicle 100 along the curved road. However, there is a possibility that the steering wheel operation delays and the target vehicle 100 cannot suitably travel along the curved road.

With the vehicle driving assist device 10 of this example, the setting of the guide steering angle δguide (guide steering operation amount) is started at the timing earlier than the steering wheel operation start time t (steering operation start time). As a result, the steering reaction force is reduced at an earlier timing. Therefore, even when the curve radius R is small (when the degree of curve of the curved road is high), the steering wheel operation (steering operation) for causing the target vehicle 100 to travel along the curved road is performed without delay. As a result, the target vehicle 100 can suitably travel along the curved road.

When the curve radius R is small, the driver needs to operate the steering wheel more greatly to drive the target vehicle 100 along the curved road. Therefore, there is a strong possibility that the steering wheel operation of the driver delays.

With the vehicle driving assist device 10 of this example, when the curve radius R is small, the preview period τ (predetermined period) for advancing the timing to start the setting of the guide steering angle δguide is set to a long period. Therefore, the setting of the guide steering angle δguide is started at a timing earlier than the timing at which the driver starts the steering wheel operation for driving the target vehicle 100 along the curved road. As a result, the steering reaction force is reduced at an earlier timing. Thus, it is possible to suppress the delay in the steering wheel operation of the driver. While the target vehicle 100 is traveling along the curved road, the actual steering angle changes in agreement (or substantially in agreement) with the target steering angle δtgt. The target vehicle 100 can suitably travel along the curved road.

When the target-vehicle speed V is high, the driver needs to perform the steering wheel operation more quickly to drive the target vehicle 100 along the curved road. Therefore, there is a strong possibility that the steering wheel operation of the driver delays.

With the vehicle driving assist device 10 of this example, when the target-vehicle speed V is high, the preview period τ for advancing the timing to start the setting of the guide steering angle δguide is set to a long period. Therefore, the setting of the guide steering angle δguide is started at a timing earlier than the timing at which the driver starts the steering wheel operation for driving the target vehicle 100 along the curved road. As a result, the steering reaction force is reduced at an earlier timing. Thus, it is possible to suppress the delay in the steering wheel operation of the driver. While the target vehicle 100 is traveling along the curved road, the actual steering angle changes in agreement (or substantially in agreement) with the target steering angle δtgt. The target vehicle 100 can suitably travel along the curved road.

When driving the target vehicle 100 along the curved road, the driver increases the steering angle (amount of steering operation) and then reduces the steering angle. When the steering angle approaches the maximum value of the target steering angle δtgt (target steering operation amount) defined by the steering angle change target, the steering angle may exceed this maximum value.

With the vehicle driving assist device 10 of this example, the maximum value δmax of the guide steering angle δguide is limited to a value smaller than the maximum value of the target steering angle δtgt by a predetermined value. Therefore, when the steering angle approaches the maximum value of the target steering angle δtgt, the steering reaction force is increased. Thus, it is possible to reduce the occurrence of a case where the steering wheel operation of the driver exceeds the maximum value of the target steering angle δtgt. While the target vehicle 100 is traveling along the curved road, the actual steering angle changes in agreement (or substantially in agreement) with the target steering angle δtgt. The target vehicle 100 can suitably travel along the curved road.

When the target-vehicle speed V is high, the driver tends to operate the steering wheel more quickly to drive the target vehicle 100 along the curved road. Therefore, the driver cannot stop the steering wheel operation at an appropriate steering angle, and the steering angle is likely to increase excessively.

With the vehicle driving assist device 10 of this example, when the target-vehicle speed V is high, the predetermined value for reducing the maximum value δmax of the guide steering angle δguide below the maximum value of the target steering angle δtgt is set to a large value. Therefore, when the steering angle approaches the maximum value of the target steering angle δtgt beyond the guide steering angle δguide in a state in which the target-vehicle speed V is high, the degree of increase in the steering reaction force is increased. Thus, it is possible to appropriately reduce the occurrence of the case where the steering angle exceeds the maximum value of the target steering angle δtgt. While the target vehicle 100 is traveling along the curved road, the actual steering angle changes in agreement (or substantially in agreement) with the target steering angle δtgt. The target vehicle 100 can suitably travel along the curved road.

In the above example, comparison is made under the assumption that the target vehicle 100 travels on a curved road with the same curve radius R. When the target-vehicle speed V is high, the gain "a" is set to a smaller value than when the target-vehicle speed V is low in order to reduce the occurrence of a case where the actual steering angle greatly exceeds the target steering angle δtgt. As a result, the maximum value of the guide steering angle δguide is reduced. Thus, a larger steering reaction force is applied to the steering wheel operation. Even though the target vehicle 100 travels on the curved road with the same curve radius R, when the target-vehicle speed V is high, the steering wheel operation needs to be performed more greatly than when the target-vehicle speed V is low in order that the target vehicle 100 appropriately travel along the curved road. Therefore, the actual steering angle is a larger value. When a larger steering reaction force is applied to the steering wheel operation, it difficult for the driver to operate the steering wheel.

Therefore, when the target-vehicle speed V is high, the vehicle driving assist device 10 sets the gain "a" to a smaller value than when the target-vehicle speed V is low in order to reduce the occurrence of the case where the actual steering angle greatly exceeds the target steering angle δtgt. The small value of the gain "a" may be limited to a value for reducing the difficulty of the driver's steering wheel operation.

When the curve radius R is small, the driver needs to operate the steering wheel more greatly to drive the target vehicle 100 along the curved road. Therefore, there is a strong possibility that the steering angle exceeds the maximum value of the target steering angle δtgt defined by the steering angle change target.

With the vehicle driving assist device 10 of this example, when the curve radius R is small, the predetermined value for reducing the maximum value δmax of the guide steering angle δguide below the maximum value of the target steering angle δtgt is set to a large value. Therefore, when the steering angle approaches the maximum value of the target steering angle δtgt in a state in which the curve radius R is small, the degree of decrease in the steering reaction force is reduced. That is, the steering reaction force is increased. Thus, it is possible to appropriately reduce the occurrence of the case where the steering angle exceeds the maximum value of the target steering angle δtgt. While the target vehicle 100 is traveling along the curved road, the actual steering angle changes in agreement (or substantially in agreement) with the target steering angle δtgt. The target vehicle 100 can suitably travel along the curved road.

When the target vehicle 100 is predicted to enter the curved road, the vehicle driving assist device 10 sets, as the steering angle change target, the target of change in the steering angle for causing the target vehicle 100 to suitably travel along the curved road. The vehicle driving assist device 10 sets the guide steering angle δguide for guiding the driver's steering wheel operation to achieve the change in the steering angle in accordance with the steering angle change target when the target vehicle 100 travels along the curved road. The vehicle driving assist device 10 reduces the steering reaction force when the steering angle is smaller than the guide steering angle δguide. The vehicle driving assist device 10 increases the steering reaction force when the steering angle is larger than the guide steering angle δguide.

The present disclosure is not limited to the above embodiment. Various modifications may be adopted within the scope of the present disclosure.

What is claimed is:

1. A vehicle driving assist device comprising a processor configured to control a steering reaction force to be applied to a steering operation performed by a driver of a vehicle, wherein the processor is configured to:

acquire a longitudinal size of an intersection with respect to the vehicle when the driver intends the vehicle to turn right or left at the intersection, wherein the longitudinal size is acquired based an intersection entrance distance and an intersection exit distance;

acquire a size of the intersection based on the longitudinal size;

set a steering angle of the vehicle necessary for the vehicle to turn right or left at the intersection as a guide steering angle based on the size of the intersection; and control the steering reaction force based on a difference between the guide steering angle and an actual steering angle.

2. The vehicle driving assist device according to claim 1, wherein the processor is configured to:

when the driver intends the vehicle to turn left at the intersection of a first kind including two or more possible left-turn roads that the vehicle is allowed to enter by turning left and which of the possible left-turn roads the driver intends the vehicle to enter by turning left is unknown, acquire the size of the intersection based on a possible left-turn road farthest from the vehicle out of the possible left-turn roads; and when the driver intends the vehicle to turn right at the intersection of a second kind including two or more possible right-turn roads that the vehicle is allowed to enter by turning right and which of the possible right-turn roads the driver intends the vehicle to enter by turning right is unknown, acquire the size of the intersection based on a possible right-turn road farthest from the vehicle out of the possible right-turn roads.

3. The vehicle driving assist device according to claim 2, wherein the processor is configured to:

when the driver starts to turn the vehicle to left at the intersection of the first kind, control on the steering reaction force is started based on the difference between the guide steering angle and the actual steering angle, and then a first possible left-turn road that the driver intends the vehicle to enter by turning left is identified, control the steering reaction force based on a difference between the actual steering angle and the guide steering angle that is set under an assumption that the vehicle is to enter the first possible left-turn road; and when the driver starts to turn the vehicle to right at the intersection of the second kind, control on the steering reaction force is started based on the difference between the guide steering angle and the actual steering angle, and then a first possible right-turn road that the driver intends the vehicle to enter by turning right is identified, control the steering reaction force based on a difference between the actual steering angle and the guide steering angle that is set under an assumption that the vehicle is to enter the first possible right-turn road.

4. The vehicle driving assist device according to claim 1, wherein the processor is configured to:

acquire a lateral size of the intersection with respect to the vehicle; and acquire the size of the intersection based on the lateral size.

5. The vehicle driving assist device according to claim 1, wherein the processor is configured to set the guide steering angle to be smaller as the intersection is smaller.

6. A vehicle comprising:

the vehicle driving assist device according to claim 1;

a steering wheel; and a reaction force actuator, wherein the reaction force actuator is configured to apply the steering reaction force controlled by the processor to the steering operation when a force of the steering operation performed by the driver is applied to the steering wheel.

7. A vehicle driving assist method for controlling a steering reaction force to be applied to a steering operation performed by a driver of a vehicle, the vehicle driving assist method comprising:

acquire a longitudinal size of an intersection with respect to the vehicle when the driver intends the vehicle to turn right or left at the intersection, wherein the longitudinal size is acquired based an intersection entrance distance and an intersection exit distance;

acquiring a size of the intersection based on the longitudinal size;

setting a steering angle of the vehicle necessary for the vehicle to turn right or left at the intersection as a guide steering angle based on the size of the intersection; and controlling the steering reaction force based on a difference between the guide steering angle and an actual steering angle.

8. A non-transitory storage medium storing instructions that are executable by one or more processors and that cause the one or more processors to perform functions for controlling a steering reaction force to be applied to a steering operation performed by a driver of a vehicle, wherein the functions comprise:

acquiring a longitudinal size of an intersection with respect to the vehicle when the driver intends the vehicle to turn right or left at the intersection, wherein the longitudinal size is acquired based an intersection entrance distance and an intersection exit distance;

acquiring a size of the intersection based on the intersection;

setting a steering angle of the vehicle necessary for the vehicle to turn right or left at the intersection as a guide steering angle based on the size of the intersection; and controlling the steering reaction force based on a difference between the guide steering angle and an actual steering angle.

9. The vehicle driving assist device according to claim 1, wherein the intersection entrance distance is a distance between an entrance of the intersection and the vehicle, and the intersection exit distance is a distance between the vehicle and an exit of the intersection.

10. The vehicle according to claim 6, wherein the intersection entrance distance is a distance between an entrance of the intersection and the vehicle, and the intersection exit distance is a distance between the vehicle and an exit of the intersection.

11. The vehicle driving assist method according to claim 7, wherein the intersection entrance distance is a distance between an entrance of the intersection and the vehicle, and the intersection exit distance is a distance between the vehicle and an exit of the intersection.

12. The non-transitory storage medium according to claim 8, wherein the intersection entrance distance is a distance between an entrance of the intersection and the vehicle, and the intersection exit distance is a distance between the vehicle and an exit of the intersection.

* * * * *